(12) United States Patent
Plum

(10) Patent No.: US 7,584,461 B2
(45) Date of Patent: Sep. 1, 2009

(54) AUTOMATED SAFE SECURE TECHNIQUES FOR ELIMINATING UNDEFINED BEHAVIOR IN COMPUTER SOFTWARE

(76) Inventor: Thomas S. Plum, 3 Waihona Pl., Kamuela, HI (US) 96743

( * ) Notice: Subject to any disclaimer, the term of this patent is extended or adjusted under 35 U.S.C. 154(b) by 634 days.

(21) Appl. No.: 10/964,830

(22) Filed: Oct. 15, 2004

(65) Prior Publication Data

US 2005/0097535 A1 May 5, 2005

Related U.S. Application Data

(63) Continuation of application No. 10/941,023, filed on Sep. 15, 2004, now abandoned.

(60) Provisional application No. 60/511,649, filed on Oct. 17, 2003, provisional application No. 60/502,620, filed on Sep. 15, 2003.

(51) Int. Cl.
*G06F 9/45* (2006.01)
(52) U.S. Cl. ..................................................... 717/143
(58) Field of Classification Search ......... 717/131–143, 717/109, 144, 156, 159; 719/315; 714/38, 714/53
See application file for complete search history.

(56) References Cited

U.S. PATENT DOCUMENTS

| | | | | |
|---|---|---|---|---|
| 5,583,988 | A * | 12/1996 | Crank et al. | 714/48 |
| 5,640,564 | A * | 6/1997 | Hamilton et al. | 719/315 |
| 6,149,318 | A * | 11/2000 | Chase et al. | 717/131 |
| 6,154,876 | A * | 11/2000 | Haley et al. | 717/133 |
| 6,452,990 | B1 | 9/2002 | Leis et al. | |
| 6,542,990 | B1 | 4/2003 | Tremblay et al. | |
| 6,634,023 | B1 | 10/2003 | Komatsu et al. | |
| 6,802,056 | B1 * | 10/2004 | Chaiken et al. | 717/136 |
| 7,155,602 | B2 * | 12/2006 | Poznanovic | 713/1 |

OTHER PUBLICATIONS

Fergus Henderson, "Accurate Garbage Collection in an Uncooperative Environment," ISMM '02, (Jun. 20-21, 2002), Berlin, Germany.
David Berlind, Ex-Cybersecurity czar Clarke issues gloomy report card—TechUpdate—ZDNet, http://techupdate.zdnet.com/Clarke_issues_gloomy_report_card_.html, "Orldano, Fla.- Richard Clarke has more bad news for IT execs" (Oct. 2003).
Hans-J Boehm, "A Garbage Collector for C and C++", .(http://www.hpl.hp.com/personal/Hans_Boehm/gc/) (2004).
Mark Mitchell et al., "Itanium C++ ABI" (http://www.codesourcery.com/cxx-abi/abi.html) (2003).
Todd M. Austin, "Efficient Detection of All Pointer and Array Access Errors," SIGPLAN 94-6/94 Orlando, Florida, USA (1994).
CERT/CC. See http://www.cert.org/stats/cert_stats.html for current statistics (1988-2005).
CERT/CC.US-CERT's Technical Cyber Security Alerts. http://www.us-cert.gov/cas/techalerts/index.html (2004-2005).

(Continued)

*Primary Examiner*—Tuan Anh Vu
(74) *Attorney, Agent, or Firm*—Nixon & Vanderhye P.C.

(57) ABSTRACT

Automated (e.g., compiler implemented) techniques provide safe secure software development. One exemplary illustrative implementation addresses undefined behavior in the C and C++ programming languages.

14 Claims, 11 Drawing Sheets

OTHER PUBLICATIONS

Dor, N., Rodeh, M., and Sagiv. M. "CSSV: Towards a Realistic Tool for Statically Detecting All Buffer Overflows in C," PLDI'03, San Diego, California, pp. 155-167 (Jun. 9-11, 2003).

Gupta, R., "Optimizing Array Bound Checks Using Flow Analysis," ACM Letters on Programming Languages and Systems, vol. 2, Nos. 1-4, pp. 135-150 (Mar.-Dec. 1993).

ISO/IEC WDTR 24731, Information Technology-Programming languages, their environments and system software interfaces-Specification for Secure C Library Functions (Dec. 19, 2004) [ISO/IEC JTC1 SC22 WG14 N1093, "Programming languages, their environments and system software interfaces—Specification for Secure C Library Functions," www.open-std.org/jtc1/sc22/wg14/www/docs/n1093.pdf (2004)].

Lovell, M., "Safe! Repel Attacks on Your Code with the Visual Studio 2005 Safe C and C++ Libraries," MSDN Magazine (May 2005).

Plum Hall, Inc., "The SSCC website," http://www.plumhall.com/sscc.html (2005).

Ruwase, O. and Lam, M., "A Practical Dynamic Buffer Overflow Detector," Proceedings of the Network and Distributed System Security (NDSS) Symposium, pp. 159-169 (Feb. 2004).

Standard Performance Evaluation Corporation (SPEC), SPEC CPU2000: Component CPU Integer (CINT2000 http://www.spec.org ) (2000).

INCITS/ISO/IEC 9899-1999, Programming Languages—C, Second Edition (1999).

INCITS/ISO/IEC 14882-2003, Programming Languages—C++, Second Edition (2003).

International Search Report, PCT/US04/34422 (Mar. 30, 2006).

Dhurjati, Dinakar et al., "Backwards-Compatible Array Bounds Checking for C with Very Low Overhead," ICSE '06, May 20-28, 2006, Shanghai, China, pp. 1-10.

Rinard, Martin et al., "Enhancing Server Availability and Security Through Failure-Oblivious Computing," 14 pages, presented at USENIX OSDI Dec. 6-8, 2004.

International Search Report, PCT/US04/30029 (Aug. 24, 2006).

Seacord, Robert, Secure Coding in C and C++ (2005).

"CenterLine Announces QualityCenter Automated Testing Tools," Dr. Dobb'sPortal, http://www.ddj.com/cpp/184403081 (Oct. 1, 1995).

* cited by examiner

Fig. 1  Example Safe Secure Software Development System

41 Safe Secure Pointer Attribute Hierarchy

| Attribute | Implies these other Attributes |
|---|---|
| Unk | Ni |
| Nul | Ni |
| Qi | T |
| Nth | T |
| Ntl | T |
| End | Ni, Nnul, Ntl |
| I | Nnul, Ntl, Nth |
| Nullterm | I |
| Lo | I |
| Hi | I |

Figure 7

51 Safe Secure Pointer Attribute Predicates

|  | unk | nul | ni | nnul | qi | nth | ntl | end | i | lo | hi |
|---|---|---|---|---|---|---|---|---|---|---|---|
| ==End | end | end* | end* | end | end | end* | end | end | end | end* | end* |
| ==Lo | lo | lo* | lo* | lo | lo | lo | lo | lo* | lo | lo | lo* |
| ==Hi | hi | hi* | hi* | hi | hi | hi | hi | hi* | hi | hi* | hi |
| ==0 | nul | nul | nul | nul* | nul | nul* | nul* | nul* | nul* | nul* | nul* |
| !=0 | nnul ni | nnul ni* | nnul ni | nnul | i | nth | ntl | end | i | lo | hi |
| >=Lo | ntl | nul | ni ntl | ntl | qi ntl | i | ntl | end | i | lo | hi |
| <Lo | unk | nul | ni | nnul | ni* | ni | ni* | ni* | ni* | ni* | ni* |
| <=Hi | nth | nul | ni nth | nth | qi nth | nth | i | nth ni * | i | lo | hi |
| >Hi | unk | nul | ni | nnul | ni* | ni* | ni* | end | ni* | ni* | ni* |
| ++ | unk | nnul ni | ni | unk | unk | unk | ntl | ni | ntl | ntl | end |
| -- | unk | nnul ni | ni | unk | unk | nth | unk | hi | nth | ni | nth |
| counted+ |  |  |  |  |  |  |  |  | i | i |  |
| counted- |  |  |  |  |  |  |  |  | i |  | i |

Notes:
The asterisk suffixed to some state outcomes indicates a "can't happen" condition; analysis will accept the state outcome and disregard any prior attribute.

The predicate "!=0" also represents "false outcome of = =0" and any equivalent representation.

The predicate "= =0" also represents "false outcome of !=0" and any equivalent representation.

The predicate ">=Lo" also represents "false outcome of >Lo" and any equivalent representation.

The predicate "<=Hi" also represents "<End" and "false outcome of >Hi" and "false outcome of >=End" and any equivalent representation.

Assignment of an address to a pointer, or calculation of an address expression, sets the pointer attribute according to the bounds information available to the SSSA 35 at that point in the program.

Figure 8

71 Safe Secure Interface Inference Table

> If inside the called function:
>
> a pointer parameter is passed as an argument to another function (such as strlen) which requires a null-terminated argument target, then the NULLTERM Requirement is inferred.
>
> a subscript loop begins at zero (or a pointer loop begins at the parameter's value) and continues until the character target is a null character, then the NULLTERM Requirement is inferred.
>
> a pointer loop begins at the value of a pointer parameter and increments until the pointer reaches another pointer parameter's value, and elements of an array are accessed by indirection, then the second pointer parameter's Requirement is inferred to be the Hi or End of the array (a loop terminating before indexing the n-th element indicates an End value, whereas terminating upon reaching, and indexing, the n-th value indicates a Hi value).
>
> a subscript loop begins at zero and continues until the subscript reaches an integer parameter's value, and elements of an array are indexed by the subscript, then the integer parameter's Requirement is inferred to be the Bound of the array (a loop terminating before indexing the n-th element indicates a Bound value, whereas terminating upon reaching, and indexing, the n-th value indicates a value of Bound minus one).
>
> a pointer loop begins at the value of a pointer parameter and decrements until the pointer reaches another pointer parameter's value, and elements of an array are accessed by indirection, then the second pointer parameter's Requirement is inferred to be the Lo of the array and the first pointer's Requirement is inferred to be the Hi or End of the array, depending upon whether decrementing takes place before or after the first indirection.
>
> one or more pointer and/or integer parameters are passed as arguments to another function, and that function's calling sequence imposes Requirements upon those arguments, then the same Requirements are inferred for those parameters.

Figure 10

AUTOMATED SAFE SECURE TECHNIQUES FOR ELIMINATING UNDEFINED BEHAVIOR IN COMPUTER SOFTWARE

CROSS-REFERENCES TO RELATED APPLICATIONS

This application claims the benefit of Provisional Application No. 60/502,620, filed Sep. 15, 2003 and Provisional Application No. 60/511,649, filed Oct. 17, 2003. The entire contents of these provisional applications are incorporated by reference

FIELD

The technology herein relates to the design and construction of compilers which implement control flow analysis, data flow analysis, optimizations (including the type-based aliasing requirements), definite-assignment analysis, and the ANSI/ISO standards for the subject languages, and to software testing and verification. In more detail, the technology herein relates to safe secure software compiling techniques, and more particularly to a "blueprint" for methods, techniques and systems that can be used to create a particular exemplary implementation for use with the C and C++ programming languages which satisfies specified criteria for safety and security.

BACKGROUND AND SUMMARY

Most computer users have experienced times when their computer seemingly has "lost its mind" and starts behaving in seemingly unexplainable ways. For example, sometimes we command the computer to do something—but instead of doing what we ask, the computer "stops responding" and needs to be "rebooted" (e.g., turned off and back on again). This process can waste significant time while the computer restarts. Work product is sometimes lost—frustrating users to no end.

Ultimately, most such problems are caused by programming errors (sometimes called "bugs"). As computer programs become increasingly complex, it is more difficult for the people writing the computer code to take into account every possible condition that the computer program may encounter. Unfortunately, a computer program will "break" if the code encounters an undefined condition it does not "know" how to handle. This can cause serious problems. Consider for example if the software controls an airplane autopilot, a missile guidance system or a hospital life support system.

Another range of problems relates to attackers taking advantage of undefined computer program behavior to do harm. Several of the undefined behaviors of C and C++ have received much attention in the popular press as well as technical journals, because their effects have inflicted billions of dollars of damage in the USA and worldwide. In particular, the "buffer overflow" (also known as "buffer overrun") and "null pointer indirection" behaviors have created vulnerabilities in widely-used software from many different vendors. This problem of buffer overflows is no longer an obscure technical topic. This is the vulnerability through which most worms and viruses attack. The worldwide total costs due to malicious hacker attacks during 2002 have been estimated to be between 40 and 50 billion USD; costs for 2003 were estimated between 120 and 150 billion USD. See e.g., David Berlind, "Ex-cybersecurity czar Clarke issues gloomy report card" (ZDNet TechUpdate Oct. 22, 2003).

An international standard has been developed for the programming language C, which is designated ISO/IEC 9899: 2002(E). Similarly, an international standard has been developed for the programming language C++, which is designated ISO/IEC 14882:2003(E). Each of these standards defines certain situations using the category of "undefined behavior". The C Standard contains the following definition: "3.4.3 undefined behavior: behavior, upon use of a nonportable or erroneous program construct or of erroneous data, for which this International Standard imposes no requirements. NOTE Possible undefined behavior ranges from ignoring the situation completely with unpredictable results, to behaving during translation or program execution in a documented manner characteristic of the environment (with or without the issuance of a diagnostic message), to terminating a translation or execution (with the issuance of a diagnostic message)." The C++ Standard contains a similar definition: "1.3.12 undefined behavior: behavior, such as might arise upon use of an erroneous program construct or erroneous data, for which this International Standard imposes no requirements. Undefined behavior may also be expected when this International Standard omits the description of any explicit definition of behavior. [Note: permissible undefined behavior ranges from ignoring the situation completely with unpredictable results, to behaving during translation or program execution in a documented manner characteristic of the environment (with or without the issuance of a diagnostic message), to terminating a translation or execution (with the issuance of a diagnostic message). Many erroneous program constructs do not engender undefined behavior; they are required to be diagnosed.]"

Some undefined behaviors can be eliminated by using techniques already known in the current art. The next sections will describe some exemplary such techniques.

Design-time Choices [dt]

Several undefined behaviors can be addressed by design choices; these undefined behaviors are marked with "dt" in column one of the table below. In general, the guiding principle behind these design choices is that non-portable behavior is generally not as bad as undefined (unsafe) behavior. For example; byte-ordering affects the numeric value of results, but so long as address bounds are not exceeded, byte-ordered integer values produce something well-defined on each hardware platform.

a. The representation of a null pointer can be all-bits-zero.
  b. The representation of pointers can be binary two's-complement with non-signaling wraparound.
  c. Every possible binary value can be interpreted as a valid data element. Every data value can be fetched safely; in that sense, there are no "trap representations". A "trap" can result if fetch or store of an invalid pointer is attempted, but not upon calculation or comparison of addresses. Therefore, uninitialized memory can be fetched safely. An incompletely-read buffer after a read error (such as in Standard C subclauses 7.19.7.2, 7.19.7.7, 7.24.3.2, etc) still contains data bytes which will not cause traps upon fetch.
  d. A request to the allocation functions malloc and calloc to allocate zero bytes can cause the allocation of the smallest non-zero allocation.
  e. If the number-of-elements argument is zero, string and wide-string and sorting and searching functions can do-nothing gracefully.
  f. The sorting and searching functions can be limited to no more than an implementation-defined maximum number of iterations.

g. The algorithms for converting between wide characters and (narrow) characters can produce deterministic results for all inputs, in either direction. Therefore, when a stream was written wide-oriented and read byte-oriented, the behavior can be implementation-defined and not undefined, and similarly for a stream written byte-oriented and read wide-oriented.
h. The wcstok function can be implemented so that, if it is invoked with a null pointer, then the pointer argument need not be equal to the pointer argument of the previous, but can require only that the "saved" pointer must designate some non-const array of characters, null-terminated.
i. The wcstok and strtok functions can be implemented so that, if the first invocation passes a null pointer, the function can ignore it and return a null pointer; alternatively, the function can invoke a safe termination such as ss_unwind (see below).

The methods shown in this section can be used to eliminate the following undefined behaviors:

| SSM# | C-Std# | Description |
| --- | --- | --- |
| dt | c7.20.4.6 | A command is executed through the system function in a way that is documented as causing termination or some other form of undefined behavior |
| dt | c7.20.5 | A searching or sorting utility function is called with an invalid pointer argument, even if the number of elements is zero |
| dt | c7.20.5 | The comparison function called by a searching or sorting utility function alters the contents of the array being searched or sorted, or returns ordering values inconsistently |
| dt | c7.20.5.1 | The array being searched by the bsearch function does not have its elements in proper order |
| dt | c7.20.6.1 | The abs, labs (or llabs, in c99) function would return a value that cannot be represented (absolute value of the most-negative twos-complement value). |
| dt | c7.20.6.2 | The div, ldiv (or lldiv in C99) function would return a value that cannot be represented. |
| dt | c7.20.7 | The current conversion state is used by a multibyte wide character conversion function after changing the LC_CTYPE category |
| dt | c7.21.1, c7.24.4 | A string or wide string utility function is called with an invalid pointer argument, even if the length is zero |
| dt | c7.21.4.5, c7.23.3.5, c7.24.4.4.4, c7.24.5.1 | The contents of the destination array are used after a call to the strxfrm, strftime, wcsxfrm, or wcsftime function in which the specified length was too small to hold the entire null-terminated result |
| dt | c7.21.5.8, c7.24.4.5.7 | The first argument in the very first call to the strtok or wcstok is a null pointer |
| dt | c7.24.2.11 | The argument corresponding to an s specifier without an l qualifier in a call to the fwprintf function does not point to a valid multibyte character sequence that begins in the initial shift state |
| dt | c7.24.4.5.7 | In a call to the wcstok function, the object pointed to by ptr does not have the value stored by the previous call for the same wide string |
| dt | c7.24.6 | An mbstate_t object is used inappropriately |
| dt | c7.25.1 | The value of an argument of type wint_t to a wide character classification or case mapping function is neither equal to the value of WEOF nor representable as a wchar_t |
| dt | c7.25.2.2.1 | The iswctype function is called using a different LC_CTYPE category from the one in effect for the call to the wctype function that returned the description |
| dt | c7.25.3.2.1 | The towctrans function is called using a different LC_CTYPE category from the one in effect for the call to the wctrans function that returned the description |
| dt | c7.4 | The value of an argument to a character handling function is neither equal to the value of EOF nor representable as an unsigned char |
| dt | c7.19.2 | A byte input, output function is applied to a wide-oriented stream, or a wide character input, output function is applied to a byte-oriented stream |
| dt | c7.13.2.1 | After a longjmp, there is an attempt to access the value of an object of automatic storage class with non-volatile-qualified type, ... |
| dt | c7.13.2.1 | ... local to the function containing the invocation of the corresponding setjmp macro, that was changed between the setjmp invocation and longjmp call |
| dt | c6.5.16.1 | An object containing no pointers is assigned to an inexactly overlapping object or to an exactly overlapping object with incompatible type |
| dt | c6.5.16.1 | An object containing pointers is assigned to an inexactly overlapping object or to an exactly overlapping object with incompatible type |
| dt | c7.14.1.1 | A signal occurs other than as the result of calling the abort or raise function, and the signal handler refers to an object with |

-continued

| SSM# | C-Std# | Description |
|---|---|---|
| dt | c7.14.1.1 | static storage duration other than by assigning a value to an object declared as volatile sig__atomic__t, or . . . . . . calls any function in the standard library other than the abort function, the __Exit function, or the signal function (for the same signal number) |
| dt | c6.2.6.1 | A trap representation is produced by a side effect that modifies any part of the object using an lvalue expression that does not have character type |
| dt | c6.2.6.1 | A trap representation is read by an lvalue expression that does not have character type |
| dt | c6.3.1.4 | Conversion to or from an integer type produces a value outside the range that can be represented |
| dt | c6.3.1.5 | Demotion of one real floating type to another produces a value outside the range that can be represented |
| dt | c6.4.5 | The program attempts to modify a string literal |
| dt | c6.5 | Between two sequence points, an object is modified more than once, or is modified and the prior value is read other than to determine the value to be stored |
| dt | c6.5.6 | The result of subtracting two pointers is not representable in an object of type ptrdiff__t |
| dt | c6.5.7 | An expression having signed promoted type is left-shifted and either the value of the expression is negative or the result of shifting would be not be representable in the promoted type |
| dt | c6.5.7 | An expression is shifted by a negative number or by an amount greater than or equal to the width of the promoted expression |
| dt | c6.5acc | An object has its stored value accessed other than by an lvalue of an allowable type |
| dt | c6.7.3 | An attempt is made to modify an object defined with a const-qualified type through use of an lvalue with non-const-qualified type |
| dt | c6.7.3 | An attempt is made to refer to an object defined with a volatile-qualified type through use of an lvalue with non-volatile-qualified type |
| dt | c6.7.8 | The value of an unnamed member of a structure or union is used |
| dt | c6.9.1 | The } that terminates a function is reached, and the value of the function call is used by the caller |
| dt | c7.11.1.1 | The program modifies the string pointed to by the value returned by the setlocale function |
| dt | c7.11.2.1 | The program modifies the structure pointed to by the value returned by the localeconv function |
| dt | c7.13.2.1 | The longjmp function is invoked to restore a nonexistent environment |
| dt | c7.14.1.1 | A signal handler returns when the signal corresponded to a computational exception |
| dt | c7.14.1.1 | A signal is generated by an asynchronous signal handler |
| dt | c7.14.1.1 | A signal occurs as the result of calling the abort or raise function, and the signal handler calls the raise function |
| dt | c7.14.1.1 | The value of errno is referred to after a signal occurred other than as the result of calling the abort or raise function and the corresponding signal handler obtained a SIG__ERR return from a call to the signal function |
| dt | c7.19.5.2 | The stream for the fflush function points to an input stream or to an update stream in which the most recent operation was input |
| dt | c7.19.6.1, c7.19.6.2, c7.24.2.1, c7.24.2.2 | A % conversion specifier is encountered by one of the formatted input, output functions, but the complete conversion specification is not exactly %% |
| dt | c7.19.6.2, c7.24.2.2 | A c, s, or [ conversion specifier with an l qualifier is encountered by one of the formatted input functions, but the input is not a valid multibyte character sequence that begins in the initial shift state |
| dt | c7.19.7.2, c7.19.7.7, c7.24.3.2 | The contents of the array supplied in a call to the fgets, gets, or fgetws function are used after a read error occurred |
| dt | c7.19.8.1 | A partial element read by a call to the fread function is used |
| dt | c7.19.8.1, c7.19.8.2 | The file position indicator for a stream is used after an error occurred during a call to the fread or fwrite function |
| dt | c7.20.3 | A non-null pointer returned by a call to the calloc, malloc, or realloc function with a zero requested size is used to access an object |
| dt | c7.20.3.3 | The value of the object allocated by the malloc function is used |
| dt | c7.20.3.4 | The value of any bytes in a new object allocated by the realloc function beyond the size of the old object are used |
| dt | c7.20.4.5, c7.21.6.2 | The string set up by the getenv or strerror function is modified by the program |

Text Streams and Character Representations [code]

An exemplary implementation can use a specific choice among the Unix/POSIX/Linux encoding of text files (with LF line terminators), the Macintosh encoding of text files (with CR line terminators), or the Microsoft Windows encoding of text files (with CR/LF line terminators). All mbstate_t conversions can produce implementation-defined results, even after changing the LC_CTYPE category.

An implementation can make truncated-result behavior well-defined in strxfrm, strftime, wcsxfrm, or wcsftime.

The multibyte functions can behave gracefully when given a sequence not in the initial shift state, or when given any mbstate_t object.

The wide-character classifying and conversion functions can be well-defined for any wint_t input and for any LC_CTYPE setting.

The methods shown in this section can be used to eliminate the following undefined behaviors:

| SSM# | C-Std# | Description |
| --- | --- | --- |
| code | c7.19.2 | Use is made of any portion of a file beyond the most recent wide character written to a wide-oriented stream |
| code | c7.19.6.1, c7.19.6.2, c7.23.3.5, c7.24.2.1, c7.24.2.2, c7.24.5.1 | The format in a call to one of the formatted input, output functions or to the strftime or wcsftime function is not a valid multibyte character sequence that begins and ends in its initial shift state |

Secure Library [slib]

The secure library enhancements proposed to ISO/IEC JTC 1 SC22/WG14 will eliminate many opportunities for undefined behavior. Furthermore, if a formatted I/O function produces more than INT_MAX chars of output, then it can return INT_MAX.

The methods shown in this section can be used to eliminate the following undefined behaviors:

| SSM# | C-Std# | Description |
| --- | --- | --- |
| slib | c7.19.6.1, c7.19.6.3, c7.19.6.8, c7.19.6.10 | The number of characters transmitted by a formatted output function is greater than INT_MAX |

Ss_unwind [longj]

The longjmp function (and any other functions which "unwind" the stack), can check whether execution of atexit-registered functions has started. If so, one of the following implementation-defined actions can be performed: cause a return from the function that invoked the unwind or longjmp function, invoke an "extreme exit" cleanup function; or invoke the abort function. Optionally, at the point of catching the ss_unwind, a system sanity check can be performed before continuing or re-starting.

The methods shown in this section can be used to eliminate the following undefined behavior:

| SSM# | C-Std# | Description |
| --- | --- | --- |
| longj | c7.20.4.3 | During the call to a function registered with the atexit function, a call is made to the longjmp function that would terminate the call to the registered function |

Special Behavior of atexit functions [atex]

The exit function can check whether execution of the exit function has previously started. If so, one of the following implementation-defined actions can be performed: invoke an "extreme exit" cleanup function; or invoke the abort function.

The methods shown in this section can be used to eliminate the following undefined behavior:

| SSM# | C-Std# | Description |
| --- | --- | --- |
| atex | c7.20.4.3 | The program executes more than one call to the exit function |

Arithmetic Exceptions [exc]

If at compile-time the right operand of division or remainder is zero, a fatal diagnostic message can be produced. In Debug mode, if at run-time the right operand of division or remainder is zero, an "unwind" (such as ss_unwind) can be invoked, and the implementation may throw an exception of an implementation-defined type. In non-Debug mode, if at run-time the right operand of division or remainder is zero, the result can be the maximum value of the result type, which for a floating-point type may be an infinity.

If at compile-time the left operand of division or remainder is the maximum negative value of its type and the right operand is −1, a fatal diagnostic message can be produced. In Debug mode, if at run-time the left operand of division or remainder is the maximum negative value of its type and the right operand is −1, an "unwind" (such as ss_unwind) can be invoked, and the implementation may throw an exception of an implementation-defined type. In non-Debug mode, if at run-time the left operand of division or remainder is maximum negative value of its type and the right operand is −1, the result can be the maximum value of the result type.

If at compile-time the result of an integral arithmetic operation is too large for its type, a fatal diagnostic message can be produced. In Debug mode, if at run-time the result of an integral arithmetic operation is too large for its type, an "unwind" (such as ss_unwind) can be invoked, and the implementation may throw an exception of an implementation-defined type. In non-Debug mode, if at run-time the result of an integral arithmetic operation is too large for its type, the result can be the value of the twos-complement operation with wrap-around.

The methods shown in this section can be used to eliminate the following undefined behaviors:

| SSM# | C-Std# | Description |
| --- | --- | --- |
| exc | c6.5.5 | The value of the second operand of the / or % operator is zero |
| exc | c6.5exc | An exceptional condition occurs during the evaluation of an expression |

Control of Dangling Pointers [dang]

One category of undefined behavior arises from accessing freed storage. Furthermore, each freed pointer must previously have been allocated.

These undefined behaviors can be eliminated by use of garbage collection, either conservative (see, e.g., Hans-J Boehm, "A Garbage Collector for C and C++",. (http://www.hpl.hp.com/personal/Hans_Boehm/gc/)) or accurate (see e.g., Fergus Henderson, "Accurate Garbage Collection in an Uncooperative Environment", ISMM'02, June 2021, 2002, Berlin, Germany, ACM 1581135394/02/0006), supplemented with the following special treatment of pointers to terminated stack frames. Directly assigning an address in the current function's stack frame to a longer-life pointer can be prohibited. Define a pointer-retainer function as a function which stores a pointer argument in heap or static storage. Passing a pointer to stack to a pointer-retainer function can be prohibited. (Whatever data resides in the stack can be copied to heap or to static, to avoid the prohibition.)

Memory that could contain pointers can be initialized to zeroes. Therefore, (as in Boehm conservative garbage-collection) malloc allocates space that might have pointers in it, so the space is zero-filled. There can be a new attribute to describe a state named e.g "not_ptrs" for any storage which is guaranteed not to contain pointers, and a different version of malloc can be used for such storage (equivalent to GC_malloc_atomic in the Boehm library):

```
void * malloc_not_ptrs(size_t n);
```

If storage with the not_ptrs attribute is cast to pointer-to-anything, then a fatal diagnostic message can be produced. The not_ptrs attribute can be removed from any storage by assigning zero to the bytes of the storage; a byte-oriented alias is mandatory (char, or unsigned char, or a library functions such as memset which modifies the bytes of memory).

An alternative method for prevention of dangling pointers is known (see e.g., Todd M. Austin et al., *Efficient Detection of All Pointer and Array Access Errors*, Proceedings of the ACM SIGPLAN '94 Conference on Programming Language Design and Implementation, June 1994), which is a feasible solution for an implementation which operates entirely in BSAFE mode (see below).

The methods shown in this section can be used to eliminate the following undefined behaviors:

| SSM# | C-Std# | Description |
| --- | --- | --- |
| dang | c7.20.3.2, c7.20.3.4 | The pointer argument to the free or realloc function does not match a pointer earlier returned by calloc, malloc, or realloc, or the space has been deallocated by a call to free or realloc |
| dang | c7.20.3 | The value of a pointer that refers to space deallocated by a call to the free or realloc function is used |
| dang | c6.2.4 | An object is referred to outside of its lifetime |
| dang | c6.2.4 | The value of a pointer to an object whose lifetime has ended is used |

Exclusion of C 1999 Extensions [c99]

The exemplary implementation described herein does not specifically address those extensions added in the 1999 revision of C which are not features of C++. Further refinements can be produced to address the undefined behaviors related to those extensions:

| SSM# | C-Std# | Description |
| --- | --- | --- |
| c99 | c6.7.2.1 | A attempt is made to access, or generate a pointer to just past, a flexible array member of a structure when the referenced object provides no elements for that array |
| c99 | c6.7.4 | A function with external linkage is declared with an inline function specifier, but is not also defined in the same translation unit |
| c99 | c6.7.5.3 | A declaration of an array parameter includes the keyword static within the [ and ] and the corresponding argument does not provide access to the first element of an array with at least the specified number of elements |
| c99 | c7.3.4, c7.6.1, c7.12.2 | The CX_LIMITED_RANGE, FENV_AX2ESS, or FP_CONTRACT pragma is used in any context other than outside all external declarations or preceding all explicit declarations and statements inside a compound statement |
| c99 | c7.12.3, c7.12.14 | An argument to a floating-point classification or comparison macro is not of real floating type |
| c99 | c7.15.1.2 | The va_copy macro is called to initialize a va_list that was previously initialized by va_start or va_copy without an intervening invocation of the va_end macro for the same va_list |
| c99 | c7.22 | A complex argument is supplied for a generic parameter of a type-generic macro that has no corresponding complex function |
| c99 | c7.22 | The type of an argument to a type-generic macro is not compatible with the type of the corresponding parameter of the selected function |
| c99 | c7.6.1 | Part of the program tests floating-point status flags, sets floating-point control modes, or runs under non-default mode settings, but was translated with the state for the FENV_AX2ESS pragma ??off?? |
| c99 | c7.6.2 | The exception-mask argument for one of the functions that provide access to the floating-point status flags has a nonzero value not obtained by bitwise OR of the floating-point exception macros |
| c99 | c7.6.2.4 | The fesetexceptflag function is used to set floating-point status flags that were not specified in the call to the fegetexceptflag |

-continued

| SSM# | C-Std# | Description |
|------|--------|-------------|
| | | function that provided the value of the corresponding fexcept_t object |
| c99 | c7.6.4.3, c7.6.4.4 | The argument to fesetenv or feupdateenv is neither an object set by a call to fegetenv or feholdexcept, nor is it an environment macro |
| c99 | c7.8.2.1, c7.8.2.2, c7.8.2.3, c7.8.2.4, c7.20.6.1, c7.20.6.2, c7.20.1 | The value of the result of an integer arithmetic or conversion function cannot be represented |
| c99 | c6.7.3.1 | A restrict-qualified pointer is assigned a value based on another restricted pointer whose associated block neither began execution before the block associated with this pointer, nor ended before the assignment |
| c99 | c6.7.3.1 | An object which has been modified is accessed through a restrict-qualified pointer to a const-qualified type, or through a restrict-qualified pointer and another pointer that are not both based on the same object |

It would be desirable to eliminate, with commercially acceptable efficiency, further undefined behaviors in the execution of programs in the "intersection" of C and C++; that is, in C programs which use only the features described in the C++ standard, and of C++ programs which use only the features described in the C standard.

It would furthermore be desirable to automate (e.g., through compiler design) techniques to provide safe secure development of software, including but not limited to techniques for addressing undefined behavior in the C and C++ programming languages.

Advantageous features provided by exemplary illustrative non-limiting implementations of the technology herein include:

A Safe Secure Compiler ("SSC") which produces Safe Secure Object Files or fatal diagnostic messages.

A Safe Secure Inputs Check-List ("SSICL") which records checksum information for the inputs to the execution of a Safe Secure Compiler.

A Safe Secure Bounds Data File ("SSBDF") which records Requirements and Guarantees for the defined and undefined symbols in one or more corresponding object files, as well as checksum information.

A Safe Secure Linker ("SSL") which combines object files and the corresponding Safe Secure Bounds Data Files, producing either fatal link-time diagnostics or a Safe Secure Executable Program.

A Safe Secure Semantic Analyzer ("SSSA") which uses the parse tree to determine Requirements and Guarantees.

A Safe Secure Diagnostic Generator ("SSDG") which generates fatal diagnostic messages in situations where undefined behavior would result and generates various warning messages to call the programmer's attention to various other situations.

A Safe Secure Code Generator ("SSCG") which generates object code which is free from the designated sets of undefined behaviors (including "buffer overflow" and "null pointer indirection").

A Safe Secure Pointer Attribute Hierarchy ("SSPAH") which controls the inference of attributes based upon other attributes.

A Safe Secure Pointer Attribute Predicate Table ("SSPAPT") which controls the determination of attributes resulting from predicate expressions.

A Safe Secure Bounds Data Table ("SSBDT") which tabulates the Guarantees and Requirements for expressions, sub-expressions, declarations, identifiers, and function prototypes.

A Safe Secure Interface Inference Table ("SSIIT") which controls the inference of Requirements on the interface of each externally-callable function.

A Safe Secure Bounds Data Symbol Table ("SSBDST") which tabulates the Requirements and Guarantees for defined and undefined symbols during the Safe Secure Linking process.

A Safe Secure Link-Time Analyzer ("SSLTA") which matches Requirements to Guarantees for function-call, external array, and external pointer linkage contexts.

A Safe Secure Link Diagnostic Generator ("SSLDG") which generates a fatal diagnostic at link-time if any Requirement is unsatisfied; this prevents the production of any executable program.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 7 shows an exemplary illustrative non-limiting Safe Secure Pointer Attribute Hierarchy (SSPAH 41);

FIG. 8 shows an exemplary illustrative non-limiting Safe Secure Pointer Attribute Predicate Table (SSPAPT 51);

FIG. 10 shows an exemplary illustrative non-limiting Safe Secure Interface Inference Table (SSIIT 71)

DETAILED DESCRIPTION

Figure 1:
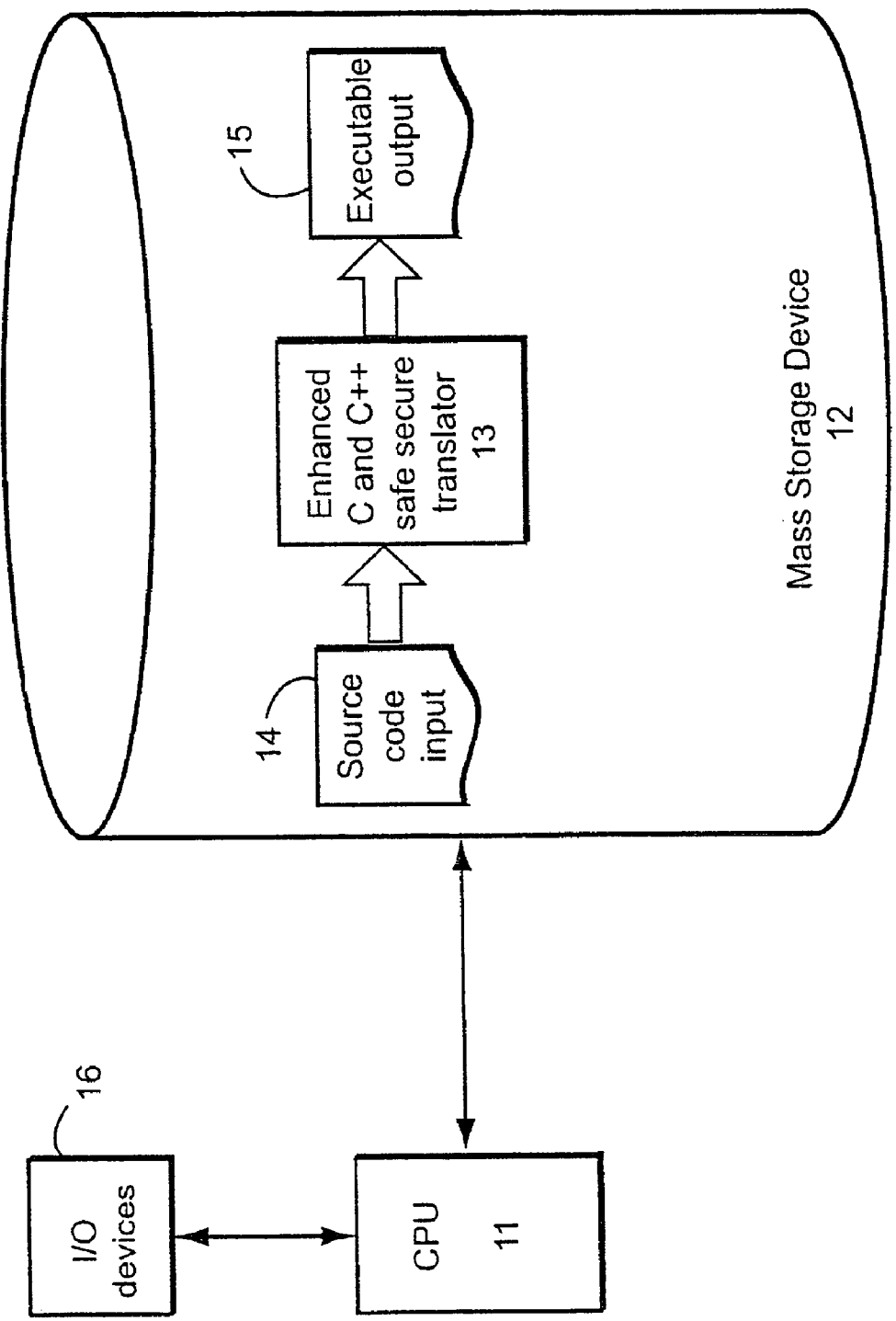
FIG. 1 shows an example safe secure software development system.

FIG. 1 shows an example illustrative non-limiting automated safe secure computer software development system 100. For example, an exemplary non-limiting system 100 may comprise a central processing unit (CPU) 11 coupled to a mass storage device 12 such as a magnetic or other disk. The CPU 11 may execute program instructions including for example a safe secure translator 13 the executable code for which is stored on the mass storage device and executed by CPU 11. When executed by CPU 11, the translator 13, in simplified terms, takes a source code input 14 and converts it to an executable output 15 that can be executed by the same or different computer. The computer system 100 may further include input/output devices 16 such as for example keyboards, pointing devices, display devices and the like so that human software developers can interact with the computer. In one exemplary arrangement, the techniques described herein can be used to enhance a conventional compiler for the C and C++ programming language (as will be described below) to eliminate undefined behavior.

Figure 2:
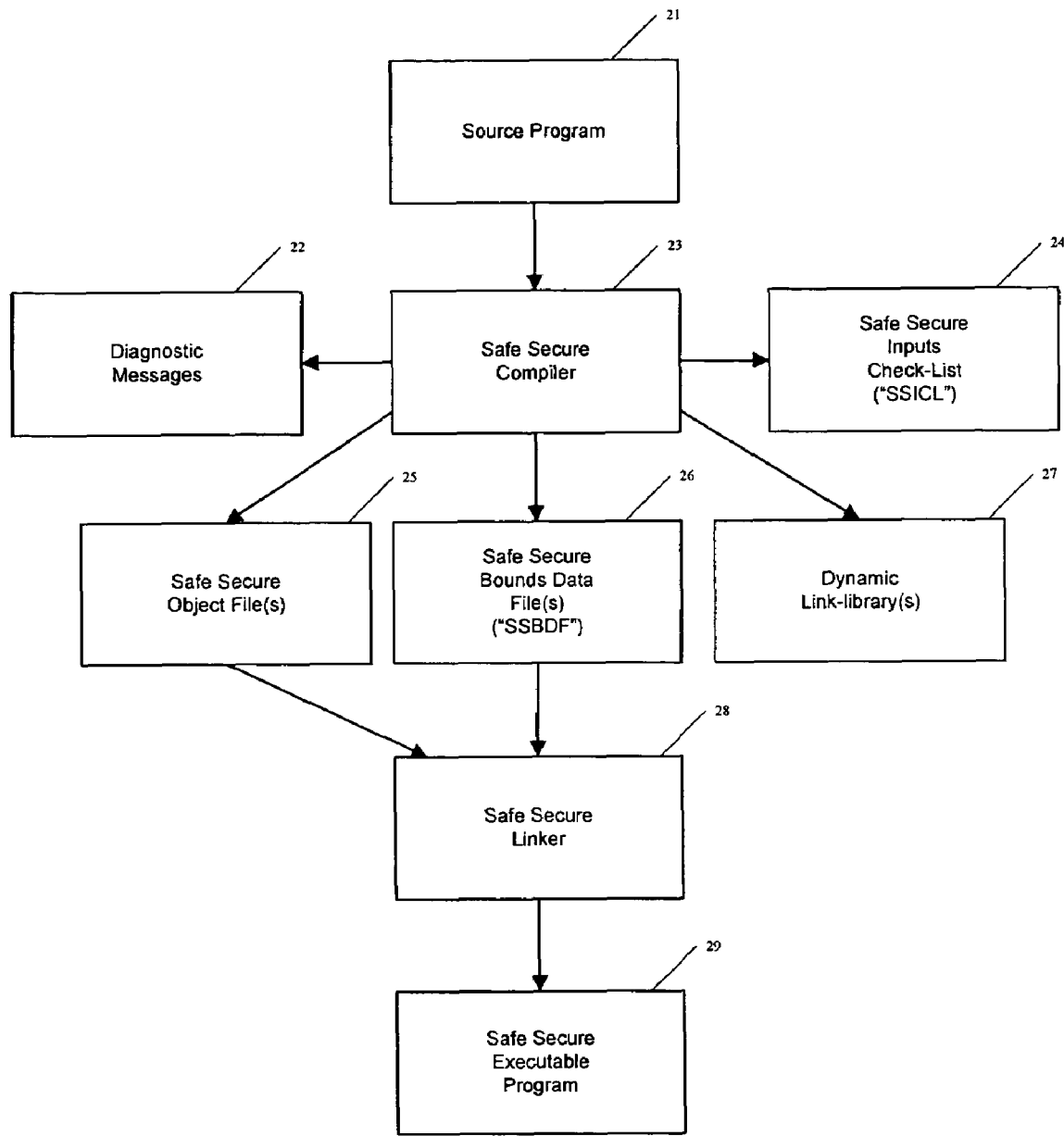
FIG. 2 shows a flow diagram of an exemplary illustrative non-limiting implementation of a program translation system.

Referring to FIG. 2, consider the following source program serving as a non-limiting illustrative example of Source Program 21 providing input to Safe Secure Compiler 23:

```
int main( ) {
return 0; }
```

Figure 3:
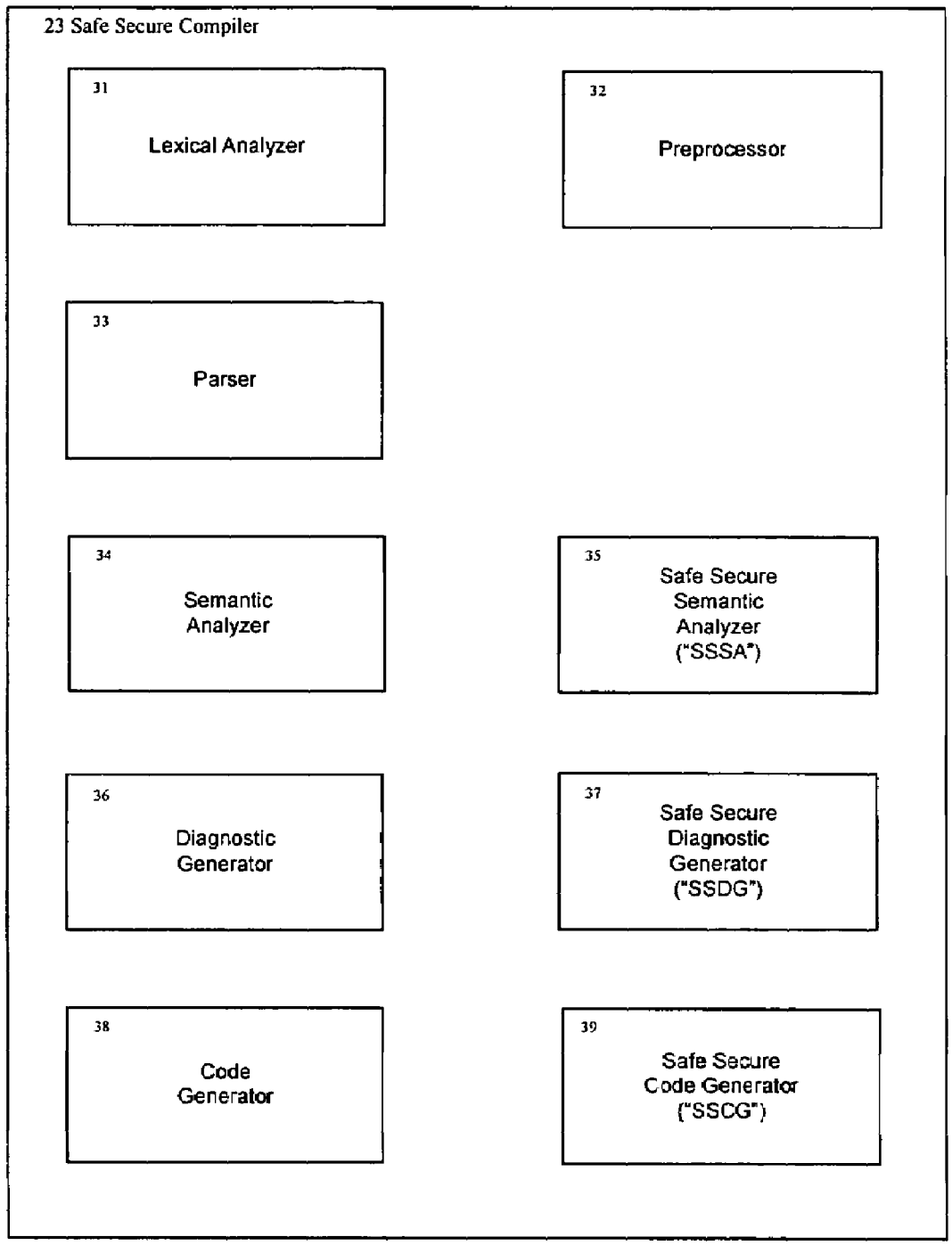
FIG. 3 shows a block diagram of an exemplary illustrative non-limiting compiler implementation.

Exemplary components of Safe Secure Translator 13 are shown in FIG. 3. In compiling this example, Lexical Analyzer 31, Preprocessor 32, and Parser 33 perform as commonly understood in the art. Then, Semantic Analyzer 34 verifies that the integer 0 is an acceptable value to return from the function "main" which is defined to return "int". After that, the Code Generator 38 will produce an Object File 25, the ultimate output from Safe Secure Compiler 23. Finally, the Safe Secure Linker 28 will combine the Object File 25 with various system-dependent library code, producing Executable Program 29.

States of Objects [stat]

The standards for C and C++ make use of modifiers upon types, known as "qualifiers" in C and "cv-qualifiers" in C++. Once declared, an identifier that designates an object (region of memory) retains its type and cv-qualifiers throughout its scope. A related concept, but distinctly different, is the state of an object.

One well-known state in modern programming languages is the "definitely assigned" state. Definite-assignment analysis is a central feature of the Java and C# programming languages. The present exemplary illustrative implementation of a Safe Secure method does not use the definitely-assigned state in quite the same way, but does make extensive use of state analysis. One example of a state used in the Safe Secure method is the pointer-null-state, which has three alternative state values. (The pointer-null-state in this example is one dimension of a more complicated pointer-range-state, shown later.)

a. Nul—pointer is null.
   b. Nnul—pointer is non-null.
   c. Qnul—pointer might, or might not, be null; i.e. "questionably-null".

Analysis of program state proceeds using flow analysis. Consider the following source program serving as another non-limiting illustrative example of Source Program 21 providing input to Safe Secure Compiler 23:

```
int main( ) {
int *p = (int*)0;
return *p; }
```

As described previously, Lexical Analyzer 31, Preprocessor 32, and Parser 33 perform as commonly understood in the art. Semantic Analyzer 34 determines that pointer p is initialized on its declaration and determines that the initial value is the null pointer value. Within Semantic Analyzer 34, control flow analysis determines that there is no transfer of control in or out of the control-flow arc from the point of initialization to the point of usage (which attempts to fetch a value from the target of pointer p) and data-flow analysis determines that there are no alterations of the value of pointer p within that arc. Control-flow analysis and data-flow analysis are commonly used to support optimization, but they also provide input data for the Diagnostic Generator 36. In the present example, the Semantic Analyzer 34 will commonly provide to the Diagnostic Generator 36 data indicating that upon all possible arcs the program would encounter the indirecting of a null pointer, and the Diagnostic Generator 36 will commonly produce a fatal diagnostic message and will commonly prevent the Code Generator 38 from producing any object code. (Each use of the term "fatal diagnostic" implies without exception that object code is never produced for any program which causes a fatal diagnostic.)

Consider this portion of another Source Program 21:

```
if (p!=0) ++n;
```

Figure 4:
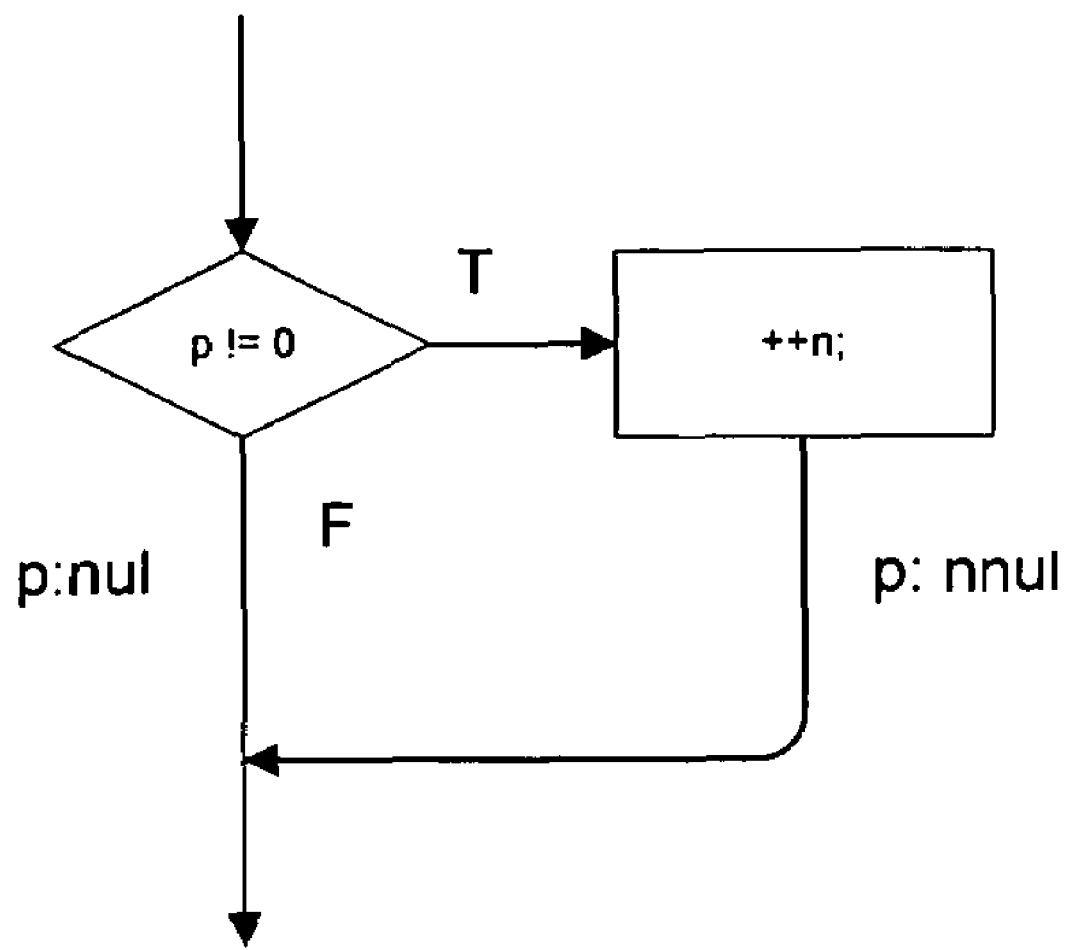
FIG. 4 shows exemplary illustrative annotation of pointer-null-state to a non-limiting illustrative flow-chart.
Figure 5:
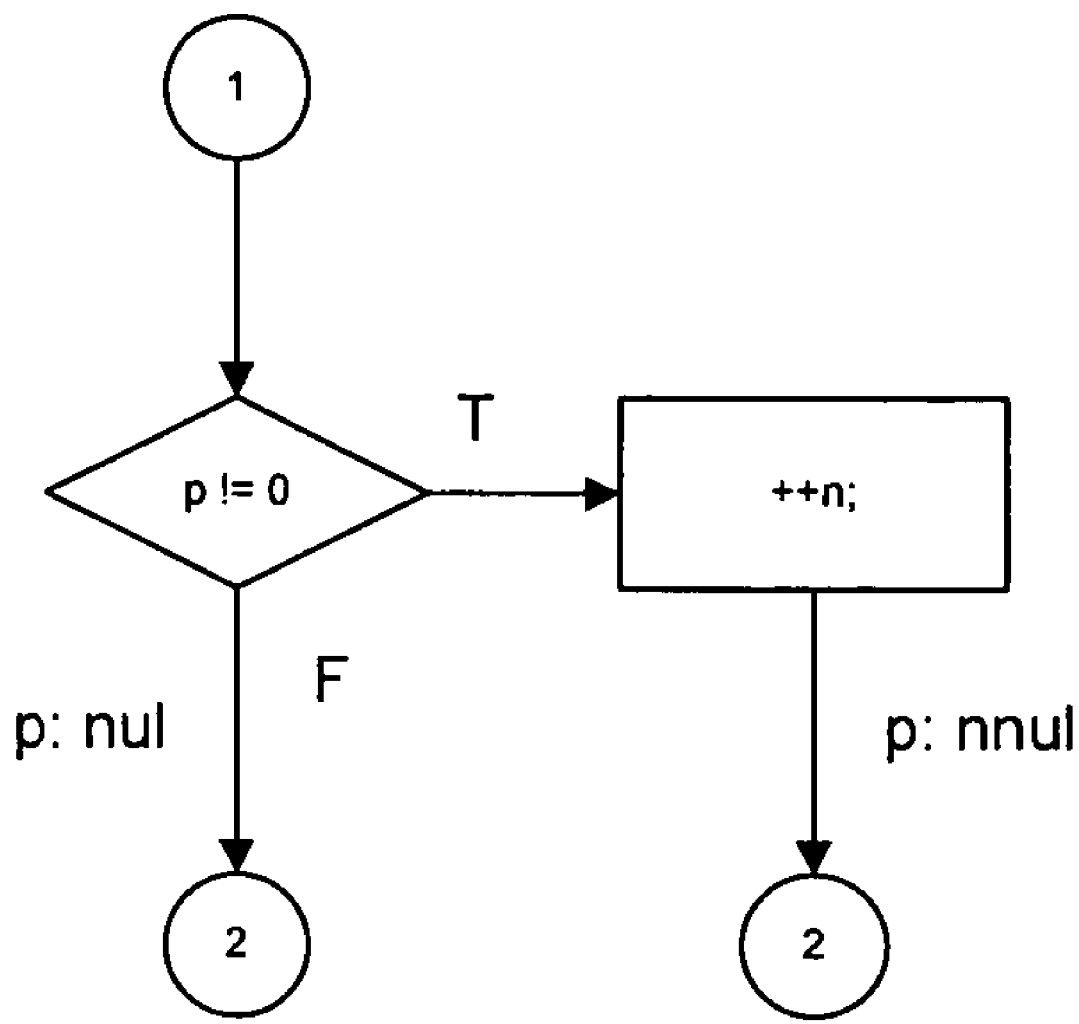
FIG. 5 shows a different exemplary illustrative representation of the same flow-chart.

FIG. 4 shows the flowchart which corresponds to the control flow in this example. In this conventional flowchart presentation, the two arcs re-join into the same flow-of-control (program-counter) state, but the pointer-null-state of p is different after the branch. An alternative presentation provides numbers (or labels) to each flow-of-control state, but records the continuation of each arc as a distinctly different state, as shown in FIG. 5. The difference is made clearer by adding another instruction to the example:

```
if (p!=0) ++n;
if (p==0) ++m;
```

Figure 6:
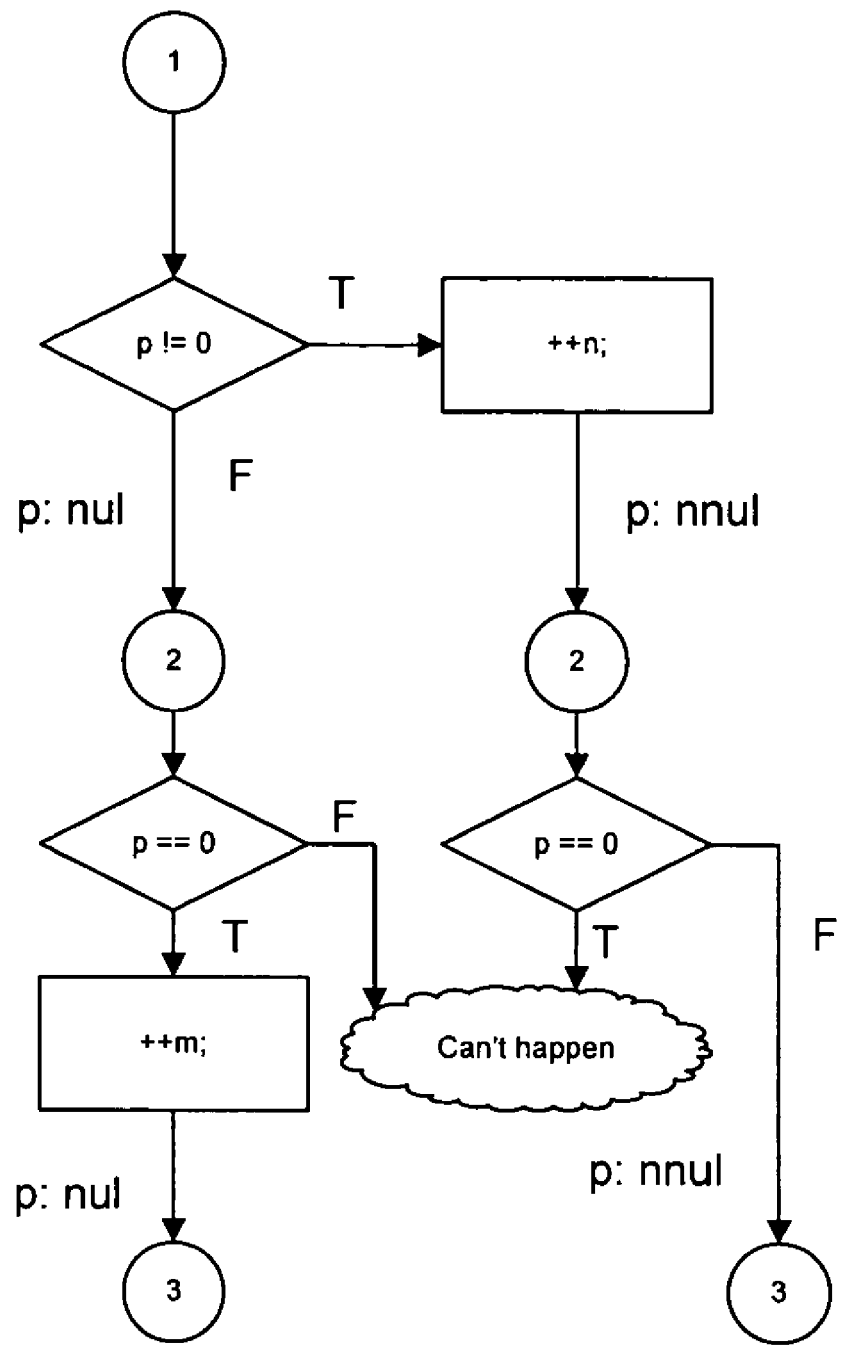
FIG. 6 shows a further exemplary illustrative flow-chart, including some "can't-happen" outcomes.

The resulting flowchart is shown in FIG. 6. The Safe Secure Semantic Analyzer ("SSSA") 35 verifies that the pointer-null-state of pointer p pre-determines the outcomes of the second "if" statement, so there are only two actual flow-of-control paths in the flowchart of FIG. 6. In the SSSA 35 the flow chart of each function is factored into separate continuations of each arc at every place in the function, except that all arcs re-join at the return from the function (and the epilog implied by that return).

The concept of "state" applies to objects during run-time. Herein, the term "attribute" is used for the compile-time designation of a run-time state of an identifier or expression.

As will be explained below, the compile-time attributes as used in the SSSA 35 are sometimes capable of modeling every detail of the run-time state analysis; in these cases the compile-time attributes are all that is needed in the analysis. In other cases, the compile-time attributes are capable of modeling many, but not all, details of the run-time state analysis; in these cases, the compile-time attributes permit compile-time diagnosis of many but not all errors. Therefore, these cases will require some bits in the run-time storage to record run-time state information.

With this background, we can describe the system of pointer-range states and attributes that is employed in the SSSA 35. We distinguish the following attributes of pointers, noting that the attributes are not mutually exclusive:

| Attribute | Description |
| --- | --- |
| Unk | Unknown |
| Nul | Null |
| Ni | not-indirectable |
| Nnul | non-null |
| Qnul | maybe-null = nul or nnul |
| Qi | maybe-indirectable = indirectable or nul |
| Nth | not too high |
| Ntl | not too low |
| End | one-too-far |
| I | Indirectable |
| Lo | At Lo limit |
| Hi | At Hi limit |
| Nullterm | At or before Hi, null-terminator is present |
| Length | Number of characters prior to null-terminator |
| T | target is defined |

Some attributes imply other attributes; see the Safe Secure Pointer Attribute Hierarchy ("SSPAH") 41 in FIG. 7 for details.

When the source program contains a test (i.e., predicate) to a pointer (or subscript) value, that pointer's attribute will be set, upon the true and false outcome arcs from that predicate; see the Safe Secure Pointer Attribute Predicate Table ("SSPAPT") 51 in FIG. 8 for details.

The Lo, Hi, End, Nth, and Ntl attributes can be applied either to a pointer or to a subscript (if the subscript's array context is clear).

The spelling and/or capitalization of the names of the attributes, values, Requirements, and Guarantees are not essential, and can be chosen to meet any other requirements. For a non-limiting example, the attribute name "Nullterm" could be abbreviated as "Nullt", and the attribute name "Indirectable" could be abbreviated as "Indir", provided that those names are unambiguous in the context in which they are used.

To determine the state transition for the Nullterm attribute, the SSSA 35 first determines the outcome Indirectable ("I") attribute; if the outcome attribute is I then it is also Nullterm; if it is not I then it is not Nullterm either. For example if a pointer p is Nullterm, and comparison <=Hi is True, the result attribute is I and is also Nullterm. But if the comparison is False, the result attribute is Ni and not Nullterm.

The present method does not require that the null pointer compares low to all other pointer values. In an alternative method, this requirement ("unsigned pointer comparison") is added to the pointer semantics; "nul>=Lo" becomes a "can't happen" condition that produces the "Ntl" attribute, and "nul>Hi" becomes a "can't happen" condition that produces the "Ni" attribute.

The Safe Secure method relies heavily upon analysis of pointer-bounds states, but there are some other significant states of storage.

In C and C++, a union can contain objects of different types at different times. In the present Safe Secure method there are no trap representations; any sequence of bytes can be fetched without causing any exceptions, and those bytes determine a value within the range of values for the type of the lvalue. Therefore, accessing a union object through an lvalue of an "incorrect" type may produce an incorrect value but will not cause an exception or any undefined behavior. Assigning a value to a union member determines the current effective type of the union, which is an important aspect of the run-time system of states. In the Safe Secure method, assigning a pointer (address) value to a union object establishes the state of all union members which are pointers to types with the same representation and alignment. Consider the following example:

union { char *p; unsigned char *q; int n; } u;
char a[3] = "ab";
u.p = a; // u.p and u.q are in Indirectable (i) state, and equal to Lo of a
u.n = 0; // u.p and u.q are in Unknown (unk) state In the terminology of the Safe Secure method, all the attributes shown so far appear as Guarantees, i.e. post-conditions, established by various predicates on arcs of control flow. In subsequent sections, attributes will be used in Requirements, i.e. pre-conditions, Stream objects can in one exemplary implementation contain an "is-open" run-time state which is reflected in a compile-time attribute (called e.g. "is_open"). The representation of the is-open state can in one exemplary implementation be non-zero.

After the standard C and C++ library function setvbuf is invoked, the calling program should make no further use of the array provided to the buf argument. In the Safe Secure Bounds Data File 26 which contains data for the setvbuf function, a post-condition specifies that the buf argument is Not-Indirectable after invocation, using methods defined in the next section.

The methods shown in this section will eliminate the following undefined behaviors:

| SSM# | C-Std# | Description |
| --- | --- | --- |
| stat | c6.2.4, c6.7.8, c6.8 | The value of an object with automatic storage duration is used while it is indeterminate |
| stat | c7.19.3 | The value of a pointer to a FILE object is used after the associated file is closed |
| stat | c6.5.3.2 | The operand of the unary * operator has an invalid value |
| stat | c7.19.5.3 | An output operation on an update stream is followed by an input operation without an intervening call to the fflush function or a file positioning function, . . . |
| stat | c7.19.5.3 | . . . or an input operation on an update stream is followed by an output operation with an intervening call to a file positioning function |
| stat | c7.19.5.6 | An attempt is made to use the contents of the array that was supplied in a call to the setvbuf function |
| stat | c7.19.7.11 | The file position indicator for a binary stream is used after a call to the ungetc function where its value was zero before the call |

-continued

| SSM# | C-Std# | Description |
|---|---|---|
| stat | c7.19.9.2 | The fseek function is called for a text stream with a nonzero offset and either the offset was not returned by a previous successful call to the ftell function on a stream associated with the same file or whence is not SEEK_SET |
| stat | c7.19.9.3 | The fsetpos function is called to set a position that was not returned by a previous successful call to the fgetpos function on a stream associated with the same file |

Safe Pointers [buf]

In the present method, all pointers are implemented as "compile-time-safe pointers", subject to a maximal verification at compile time.

The target-size, or Tsize, is defined as the number of bytes in the object or array designated by the pointer. The Bound is defined as the Tsize divided by the size of the type T to which the pointer is pointing. The Tsize-adjusted is the Tsize minus the size of the type T, i.e. the number of bytes in the array between the address of the first object of type T and the last object of type T. If there is only one element in the array, the Tsize-adjusted is zero.

The SSSA 35 maintains this bounds information for every pointer used to fetch-or-store; therefore, the analysis presented in this Safe Secure method will incorporate the syntax and semantics of the restrict keyword (from C99). Whenever this keyword appears, it reflects in syntax a restriction that otherwise must be stated in (non-formalized) semantics, i.e. a restriction that the target object designated by the restrict-qualified pointer does not overlap any other object that is accessible through external pointers or other argument pointers. This restriction can in one exemplary implementation be verified at compile-time to the extent that the bounds information is available. The remaining checks can in one exemplary implementation be verified at run-time by examination of the bounds data of the fore-mentioned set of pointers. Note that the restrict keyword is not part of the (1998 or 2002) C++ standard, but the no-overlap restriction is part of the (non-formalized) semantics of the C library contained in that C++ standard, and therefore is part of the requirements for the elimination of undefined behavior in C++ as well as C.

Figure 9:
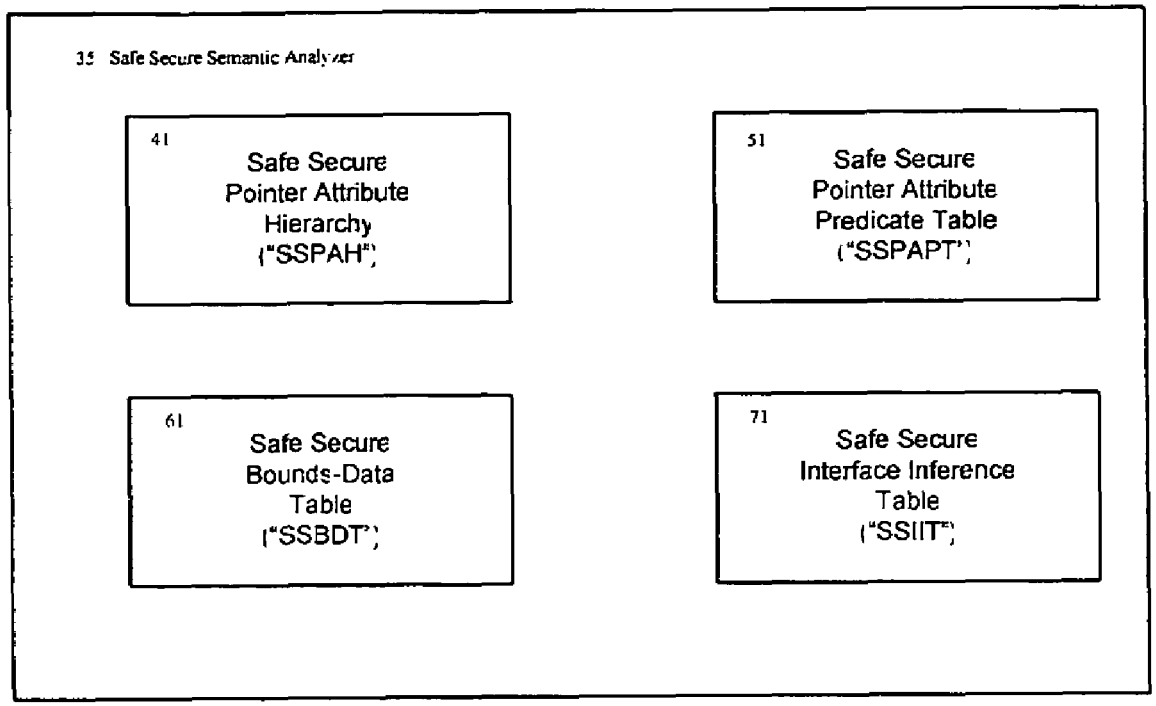
FIG. 9 shows exemplary illustrative non-limiting components of a Safe Secure Semantic Analyzer (SSSA 35)

Components of the SSSA 35 are as shown in FIG. 9.

A pointer value that designates an object in an array has a compile-time relationship with the bounding addresses of the array. When a pointer value is assigned to a pointer object, the target pointer object receives all the attributes pertaining to the original pointer. All pointer arithmetic (ptr+n, ptr−n, ptr−ptr, ptr[n]) checks the result (at compile-time, link-time, or run-time) against the Lo-Hi bounds; the End ("one-too-far") value is permissible as a result from pointer arithmetic. Fetching or storing via indirection operators (explicitly via "star" or implicitly in the lvalue use of subscript) causes the SSSA 35 to check the pointer or subscript against the Lo-Hi bounds; the "one-too-far" value is not permissible for fetching or storing. If at run-time, any bounds are exceeded, in Debug mode ss_unwind is invoked (see Ss_unwind [longj]); in non-Debug mode the semantics of _Sat, _Modwrap or _Zerobound (defined later in this section) are produced by the SSCG 39, based upon considerations of best performance. In the alternative, any algorithm of alternating between semantics is allowable. The underlying intent of this alternative is that programmers will not be given an expectation that any specific semantics is predictable or deterministic.

A compile-time-safe pointer uses the same (one-word) representation as the ordinary C or C++ implementation. In all contexts that require bounds information, that information is made known to the SSSA 35 through a variety of mechanisms. In compile-time-safe code, the SSSA 35 ensures that each non-scalar pointer must have, within the same region (global static, block static, block local, parameters, or heap) bounds information (or bounds information stored in the global static region), stored in locations made known to the Safe Secure Compiler 23, sufficient to verify the safety of any fetches or stores expressed in the program.

Here is an itemization of the contexts that require or use bounds information for a pointer: arithmetic (p+n, p−n, p−p), subscripting (p[n] and n[p]), pointer argument passing, returning a pointer, taking the address-of, pointer copying and assignment. For each pointer variable or expression appearing in a context which requires bounds information, that bounds information is inferred by the SSSA 35, using one of several alternative methods.

The SSSA 35 stores Guarantees and Requirements for pointer bounds in the Safe Secure Bounds-Data Table ("SSBDT") 61. A subset of this information is also stored in the Safe Secure Bounds-Data File ("SSBDF") 26, namely all bounds data entries which provide information about the Requirements and Guarantees of references to, and definitions of, external arrays, external pointers, and the parameters and return type of externally-callable functions, i.e. function prototype entries. At or before termination of execution of the SSSA 35, all function prototype entries in the SSBDT 61 are written to the SSBDF 26 contained in a persistent storage ("file storage").

The format and representation of the SSBDT 61 can be optimized to suit the requirements of each SSSA 35. In the SSBDT 61, the Guarantees and Requirements are attached as needed to expressions, sub-expressions, declarations, identifiers, and function prototypes, using whatever indexing or coordinates as are needed to identify the relevant location in the internal representation of the Parser 33. For purposes of presentation in the present Safe Secure method, all entries in the SSBDT 61 will be represented in the narrative text or in the style of macro invocations inserted into the Source Program 107. In the present method, this representation does not presuppose that any such invocations of actual macros are present in the actual Source Program 107. The Safe Secure method requires that one or more of the following are provided:

1. The Parser 33 recognizes some notation identical to or equivalent to the macro notation shown herein; or,
2. The SSSA 35 provides a method whereby the human programmer can add annotations to the SSBDT 61 and SSBDF 26. If the Compiler 23 is a component in an Interactive Design Environment (IDE), then the mechanism for adding annotations to the SSBDT 61 and SSBDF 26 can be integrated into the IDE.

The concepts of pre-condition and post-condition are well-known. Note that "Requirement" as used herein is synonymous with "pre-condition" and that "Guarantee" is synonymous with "post-condition", with the following contextual difference: in some technology communities the terms "pre-condition" and "post-condition" are primarily used for annotations made by the human programmer. The choice herein of different terminology is intended to avoid this connotation; the huge number of Requirements and Guarantees required by the Safe Secure methods would be an unreasonable burden if performed only by human annotation.

The entries in the SSBDT 61 are represented as follows:

| | |
|---|---|
| char *p BOUND_IS(n) | n provides the Bound of p. |
| char *p LENGTH_IS(n) | n provides the Length of p |
| char *p TSIZE_IS(n) | n provides the Tsize of p |
| char *p TSIZEA_IS(n) | n provides the Tsize-adjusted of p |
| char *p INDIRECTABLE | p is Indirectable |
| char *p NOT_INDIRECTABLE | p is Not Indirectable |
| char a[ ] LO_IS(p) | p provides the Lo of a |
| char HI_IS(p) a[ ] | p provides the Hi of a |
| char LO_IS(p) HI_IS(q) a[ ] | p provides the Lo of a and q provides the Hi of a |

For convenience and flexibility, alternative annotations are provided, which can be attached to the declaration of the integer or pointer which is providing the bounds information:

| | |
|---|---|
| int n IS_BOUND_OF(p) | n provides the Bound of p |
| int n IS_LENGTH_OF(p) | n provides the Length of p |
| int n IS_TSIZE_OF((p,q)) | n provides the Tsize of p and of q |
| int n IS_TSIZEA_OF((p,q,r)) | n provides the Tsize-adjusted of p, of q, and of q |
| char *p IS_HI_OF (a) | p provides the Hi of a |
| char *p IS_LO_OF(a) | p provides the Lo of a |
| char *p IS_END_OF(a) | p provides the End of a |

As indicated by the last examples, all the IS_*_OF annotations accept a variable number of names, enclosed within a second level of parentheses.

If the Lo bound is not explicitly specified, then the initial value of each pointer in each scope is initially the Lo bound. The initial Lo bound plus the initial Bound (or Length or Tsize) value determines the Hi bound.

The default for a pointer without any bounds annotation is Not-Indirectable.

The SSSA 35 can infer from the source code of a function that a parameter is being used as the Hi, or Bound, or Length, or Tsize, of another parameter. The itemized set of rules for the inference is detailed in FIG. 10.

There are several special cases for the bounds annotations in the SSBDT 61:

| | |
|---|---|
| int n IS_BOUND_OF(return) | n provides the Bound of the function's returned pointer |
| int n IS_LENGTH_OF(return) | n provides the Length of the function's returned pointer |
| int n IS_TSIZE_OF(return) | n provides the Tsize of the function's returned pointer |
| char *p IS_HI_OF(return) | p provides the Hi of the function's returned pointer |
| char * QI(return) f( ) { | function f returns a Maybe-Indirectable return value |

Note that any attributes provided for the function's returned value are always Guarantees and never Requirements, because the returned value comes into existence only upon function return. Attributes provided for the function's parameters are both Requirements and Guarantees (unless specifically indicated otherwise), since the attribute is presumed to hold before and after execution of the function.

The SSBDT 61 also uses a special notation for NULLTERM, for char arrays which are guaranteed to be null-terminated:

```
int main(int argc, NULLTERM char* argv[ ]
    BOUND_IS(argc) );
```

In the SSBDT 61, void* generic pointers are annotated just the same as char* pointers.

When one parameter (such as n in this example) provides bounds data for a pointer (such as s1 in this example), that pointer is understood to be Indirectable. However, if one parameter provides bounds data but a pointer is explicitly Maybe-Indirectable, then either the pointer is null or it is indirectable and has bounds data.

If both Tsize and Bound are specified for the same object, then the Tsize is the Tsize of one element, and the Bound is the number of elements. For a non-limiting example, the standard library function calloc is represented in the SSBDT 61 as follows:

```
void * QI(return) calloc(
    size_t a IS_BOUND_OF(return), size_t b IS_TSIZE_OF(return)
);
```

If both Tsize (or other bounds data) and Nullterm are specified for the same pointer, then the Tsize is understood as the largest object that will be accessed through this pointer. For example, the standard library function strncpy is represented in the SSBDT 61 as follows:

```
char * strncpy(
    char *s1, const char *s2 NULLTERM,
    size_t n IS_TSIZE_OF((s1,s2))
);
```

In the notation described so far, the attributes for "indirectable" and "null-terminated" represent Requirements-and-Guarantees for arguments and Guarantees for returned value. These attributes can also be used for Guarantees (post-conditions) upon an argument when there is no corresponding Requirement (pre-condition) upon entry to the function. An additional marker ("POST") is used to indicate post-conditions (Guarantees) in the notation of the SSBDT 61:

```
int swprintf(wchar_t * restrict s
    POST(NULLTERM) LENGTH_IS(return),
    size_t n IS_BOUND_OF(s),
    const wchar_t * restrict format NULLTERM, ...);
```

This notation indicates that there is no Requirement for null-termination of s upon entry to the swprintf function, but there is a Guarantee of null-termination upon return from the function.

When a pointer or subscript which has a bounds attribute is assigned to another pointer or integer variable, both the source and the target acquire that specific bounds attribute. When one of those variables is modified, the other variable retains the bounds attribute. For a non-limiting example, if a pointer equals the Lo bound, and then that pointer is incremented, then any other Lo for that pointer retains its Lo attribute. Here is a non-limiting example:

```
void f(int *p) {
    int *q = p; // p and q are the LO of p and the LO of q
    ++p; // now only q is the LO of p; it is also the LO of q
```

At any particular point in the control flow of the Source Program 107, attribute information might be redundantly attached to several different objects. If one of these objects is subsequently modified, another object may retain the attribute as before. Here is a non-limiting example:

```
void f(int n, int *p BOUND_IS(n) ) {
    int *q = p + n; // at this point, q is the END of p
    --n; // because q holds the
         END value, n is no longer BOUND_OF(p)
```

The SSSA 34 embodies a rule that can be summarized informally as "half a loaf is better than none": if there is only one copy of the LO, HI, END, BOUND, TSIZE, TSIZEA, or LENGTH, and if that copy is incremented or decremented, then that copy retains the appropriate attribute. Here is an illustrative non-limiting example:

```
void f(char *p) {
int a[N] = {0}; // at this point, n is the BOUND of p
int *p = a; // now, p is the LO of a and the LO of p
int *q = p + n; // at this point, q is the END of p
--n; // because we saved the END value, n is no longer BOUND_OF(p)
```

Here is a similar non-limiting example:

```
int n = N;
int a[N] = {0}; // at this point, n is the BOUND of p
int *p = a; // now, p is the LO of a and the LO of p
int *q = p + n; // at this point, q is the END of p
--n; // because we saved the END value, n is no longer BOUND_OF(p)
```

In the SSBDT 61 there is no need to re-state the type information that was present in the function prototypes; the table needs only to contain the bounds-data annotations. Some of the subsequent non-limiting examples of SSBDT 61 notation will omit extraneous type information to permit more concise presentation. However, complicated declarators such as pointer-to-pointer will still require some way to show which level of pointer or array the annotation pertains to; these methods are indifferent to the specific scheme of notation. The present method covers the functional behavior of the use of the bounds data without limitation to one specific notation.

In some cases, separate bounds-data entries are required for the separate annotation of SUCCEED and FAIL cases (and see Function invocation patterns [invoc]). For a non-limiting example, consider the two separate annotations which the SSSA 35 would make in the SSBDT 61 after analyzing the standard C and C++ library function fgets:

| SUCCEED | fgets(s POST(NULLT), n IS_TSIZE_OF(s), stream INDIR) |
| FAIL | fgets(s, n IS_TSIZE_OF(s), stream INDIR) |

This notation means that when fgets returns successfully, the string pointed to by s is null-terminated; when fgets returns unsuccessfully, there is no Guarantee about null-termination. In either case, n is the Tsize of s (a Requirement upon entry to fgets, and a Guarantee upon return from fgets), and stream is Indirectable (a Requirement upon entry to fgets, and a Guarantee upon return from fgets).

When the Requirements and Guarantees within one function are different in different blocks within the function, and when one set of such blocks is controlled by an if-else test upon a parameter value, that function is analyzed as two separate functions which depend upon an attribute of an argument. For a non-limiting example, consider the two separate annotations which the SSSA 35 would make in the SSBDT 61 after analyzing the standard C and C++ library function mbtowc:

```
mbtowc(pwc, s IS_NULL, n)
mbtowc(pwc INDIR, s, n IS_TSIZE_OF(s) )
```

For further non-limiting examples of the annotation in the SSBDT 61 (and the various special cases mentioned above), consider the following bounds-data entries for various functions from the C and C++ standard library.

```
setbuf(stream INDIR, buf INDIR)
setvbuf(stream INDIR, buf IS_NULL, mode, size)
setvbuf(stream INDIR, buf POST NOT_INDIR, mode, size IS_TSIZE_OF(buf) )
vfprintf(stream INDIR, fmt NULLT, arg)
fgetpos(stream INDIR, pos INDIR)
fclose(stream INDIR)
fsetpos(stream INDIR, pos INDIR)
fseek(stream INDIR, offset, whence)
wcstombs(s POST NULLT, pwcs NULLT, n IS_BOUND_OF(s) )
SUCCEED fgets(s POST(NULLT), n IS_TSIZE_OF(s), stream INDIR)
FAIL fgets(s, n IS_TSIZE_OF(s), stream INDIR)
vsnprintf(s POST NULLT, n IS_BOUND_OF(s), fmt NULLT, arg)
wctomb(s BOUND_IS(MB_CUR_MAX), wc)
fopen(filename NULLT, mode NULLT)
freopen(filename NULLT, mode NULLT, stream INDIR)
vprintf(fmt NULLT, arg)
strtod(nptr NULLT, endptr IS_NULL)
strtod(nptr NULLT, char NULLT ** endptr INDIR)
strtol(nptr NULLT, endptr IS_NULL, base)
strtod(nptr NULLT, char NULLT ** endptr INDIR, base)
fputs(s NULLT, stream INDIR)
remove(filename NULLT)
rename(old NULLT, new NULLT)
strchr(s NULLT, c)
mblen(s IS_NULL, n)
mblen(s NULLT, n IS_BOUND_OF(s) )
strncmp(s1 NULLT, s2 NULLT, n IS_BOUND_OF((s1,s2)) )
fwrite(ptr, size IS_TSIZE_OF(ptr), nmemb IS_BOUND_OF(s), stream INDIR)
bsearch(key, base, n IS_BOUND_OF(base), size IS_TSIZE_OF((key,base)), cmp INDIR)
memchr(s NULLT, c, n IS_TSIZE_OF(s) )
memcmp(s1, s2, n IS_TSIZE_OF((s1,s2)) )
fputc(int c, stream INDIR)
fread(ptr, size IS_TSIZE_OF(ptr), nmemb IS_BOUND_OF(ptr), stream INDIR)
memcpy(s1, s2, n IS_TSIZE_OF((s1,s2)) )
qsort(base, nmemb IS_BOUND_OF(base), size IS_TSIZE_OF(base), cmp INDIR)
memset(s, c, n IS_TSIZE_OF(s)) )
memmove(s1, s2, n IS_TSIZE_OF((s1,s2,return)) )
mbtowc(pwc, s IS_NULL, n)
mbtowc(pwc INDIR, s, n IS_TSIZE_OF(s) )
mbstowcs(pwcs, s, n IS_BOUND_OF(pwcs) )
```

As has been shown, the bounds information for a pointer is made available to the Safe Secure Compiler 23 through a variety of mechanisms depending upon the context: explicit attribute macros in a calling sequence (or equivalent programmer notations through IDE or other means), attributes inferred from usage in the called function, a visible allocation expression such as malloc or new, information made known to the linker by the SSBDF 26, or from direct visibility of an array declaration. If the programmer has provided explicit notations of bounds information, the Safe Secure Compiler 23 checks them against the inferred bounds; otherwise, the inferred bounds will be used during the compilation. It is likely that professional programmers providing library code for consumption by others will be urged to provide explicit notations.

When the Safe Secure Compiler 23 can see the assignment ptr=malloc(n) (or other standardized allocation), the specific bounds macros (LO_IS, HI_IS, END_IS, BOUND_IS, TSIZE_IS, TSIZEA_IS) are allowed but not required, because the Safe Secure Compiler 23 can infer that variable n IS_TSIZE_OF(ptr). So long as the variable n is not subsequently modified, it provides bounds information for ptr. Even if the argument to malloc has been modified, when the SSSA 35 determines that the ptr is unmodified from the original returned value, the SSCG 39 generates code to implement all the bounds macros (LO_OF, HI_OF, END_OF, BOUND_OF, TSIZE_OF, TSIZEA_OF) by accessing the heap-allocation data of the pointer ptr. However, if the function passes ptr as an argument to an external function, the function must pass the bounds information through an argument. The SSBDF 26 does not provide notation to distinguish dynamically-allocated pointers from ordinary pointers.

Analysis of pointer-range-state starts by identifying all fetch-or-store expressions that involve pointers or subscripts, and all objects and variables (i.e. named objects) that are part of those expressions. Next, identify all expressions and statements that involve those objects and variables. Then identify certain control-flow patterns which guarantee the "counted-loop" ("counted-plus" and "counted-minus") semantics.

The process can be illustrated with a small non-limiting example:

```
int m[2] = {1, 2};
int main( ) {
    int i, j = 0;
    for (i = 0; i < 2; ++i)
        j += m[i];
    return j;
}
```

Since m is defined in this translation unit, its bounds are known to the SSSA 35; specifically, its Bound is 2, its Lo is the address of m[0], its Hi is the address of m[1], and its End is the address of m[2]. The Tsize of m is 2 times sizeof(int), and its Tsize-adjusted is sizeof(int). There is only one fetch-or-store expression involving pointers or subscripts; it is the expression m[i]. The variables involved in this expression are m and i. As the Practitioner knows, the semantics of C and C++ requires that the subscript expression m[i] must be within the range of Lo to Hi; we designate this as the Requirement of the expression. The expressions and statements that involve those variables are contained in the one for-loop. The for-loop matches one of the "counted-plus" patterns, therefore the subscripting is valid. In our terminology, we refer to the for-loop as the Guarantee that satisfies the Requirement given above. Another way of stating this Requirement is that "i is a Subscript-For the array m". (For a compact notation, we can write "i SUB4(m)". The same Requirement can be applied to pointers; "p SUB4(m)" means that p is bounded between the Lo and Hi of m.)

When recognizing the patterns for a counted-loop (counted-plus and counted-minus), subscripting expressions can be converted into pointer expressions and vice-versa. Some patterns may be expressed more easily with subscripts and others with pointers. The previous example can be converted into this equivalent example:

```
int m[2] = {1, 2};
int main( ) {
    int *pi;
    int j = 0;
    for (pi = &m[0]; pi < &m[2]; ++pi)
        j += *pi;
    return j;
}
```

A scalar pointer is one which, in its scope and lifetime, is never incremented/decremented, never participates in address arithmetic, and is never subscripted (except using p[0]). It does not require bounds information.

The rules for a counted-loop (counted-plus and/or counted-minus) are the same whether a pointer is incremented/decremented or an integer subscript is incremented/decremented. These are the patterns that identify a counted-plus and/or counted-minus:

Loop limited by Bound: the loop performs N repetitions where N is less than or equal to the Bound of p, and the pointer designates a sequence of objects p through p + N − 1, or p through p − N + 1
Loop limited by Hi: the loop increments an indirectable pointer until it is equal to Hi
Loop limited by Lo: the loop decrements an indirectable pointer until it is equal to Lo
Loop limited by null terminator: the loop increments an indirectable pointer until its target is null The SSCG 39 provides semantics for several attributes of pointers and/or subscripts. The "_Sat" ("saturated") semantics generates machine-dependent instructions or software code sequences such that the pointer or subscript never increments (or adds) higher than its Hi value, and never decrements (or subtracts) lower than its Lo value. (In other words, it is like a guage that "pegs" at its minimum and maximum values.) The "_Modwrap" semantics generates machine-dependent instructions or software code sequences such that pointer and/or subscript is wrapped modulo the End value. Therefore, as the pointer or subscript is successively incremented, it runs from the Lo value to the Hi value, then starts again at the Lo value. The "_Zerobound" semantics generates machine-dependent instructions or software code sequences such that any fetch from outside the Lo-Hi limits (including the null-pointer value) produces a zero value (or a default-initialized value for a non-scalar), and any store outside the Lo-Hi limits (including the null-pointer value) produces a no-op. All three of these semantics can be implemented in silicon.

If some control flow is too complicated and doesn't fit a simple counted-plus or counted-minus pattern, and pointer-range attributes don't guarantee safe fetch-or-store access and all other compile-time bounds-checks fail, then the SSCG 39 inserts executable bounds-check code. In the Safe Secure method there are two modes of bounds-check code. When the SSCG 39 is compiling in Debug mode, every attempt to fetch or store out of bounds, or to create a pointer value out of the full range of values (which includes the one-too-far address), or to fetch-or-store through a null pointer, causes an invocation of an "unwind", such as ss_unwind (which in an interactive debugging environment causes an interactive breakpoint). In non-Debug mode, the SSCG 39 implements a choice among the following options: (a) use Debug semantics; or (b) every attempt to fetch or store out of bounds produces a well defined result (either _Sat semantics or _Modwrap semantics, or _Zerobound semantics) whichever produces the best fit to the current optimization profile (which might be "minimum code size" or "minimum CPU time" or other). A warning should be generated to inform the programmer. In non-Debug mode, every attempt to create a pointer value out of the full range of values produces an algebraically well-defined pointer value, even though that value would not be usable for indirection or bounds-testing. Note that if a pointer has the Ntl (not-too-low) attribute, and is being dynamically compared against the Hi or End value, the _Modwrap semantics will not be as efficient as the _Sat or _Zerobound semantics, because the latter semantics require only the Hi (or End) value to complete the bounds-checking. The same is true for a pointer with the Nth (not-too-high) attribute and a Lo limit.

The selection between Debug mode and non-Debug mode is conditional upon a switch set either at compile-time, at link-time (using an external flag), at load time (using an environment variable), or during run-time (using an interactive debugger)

In both Debug and non-Debug mode, the SSDG 37 generates a warning message to inform the programmer that run-time bounds-checking has been inserted by the Safe Secure Compiler 23.

The SSSA 35 provides a mechanism by which the programmer can request that, if the programmer believes that the control flow does in fact guarantee adequate bounds checks, the original control flow is communicated to the organization which distributes the SSSA 35. By incorporating this automated client feedback mechanism, said organization will have the opportunity to increase the set of counted-bounds control-flow contexts and Requirement-Guarantee patterns. To the extent that third-party organizations perform certification, validation, and/or branding of technology herein, said client feedback is subject to the same third-party processes, since the assurances of safety and security provided by the Safe Secure method are dependent upon the correctness of the patterns that are accepted by the Safe Secure method.

The full set of bounds-enforcement mechanisms may produce a number of inserted bounds-check code segments. As an optional Alternative, the Safe Secure method provides a further tool by which these bounds-checks (and the associated warnings) can be eliminated. Define an environmental interaction as a function invocation which produces a returned value or other state change which depends upon the external environment (such as command-line argument, input function, or getenv invocation). The Safe Secure method ensures that for every environmental interaction there is a guarantee that returned values and modified argument strings are either bounded in size and value, or null-terminated. If unbounded but null-terminated, the Safe Secure method requires that some bounding construct be imposed before use of the input value. (For example, a potentially very long command line argument can be converted into a numeric value by one of the string-to-numeric library functions, at which point the resulting value is bounded by the min and max of its type.) Define all the segments of code in between environmental interactions as "pure code". Use the incremental code-coverage method (Plum U.S. Pat. No. 5,758,061) to identify environmental interactions which precede code blocks which contain inserted bounds-check code segments. Let the Safe Secure Compiler 23 insert checkpoint/restart code segments at those environmental interactions. Now the environmental interactions can be simulated, using the minimum and maximum values for the input, and/or using the complete range of values for the input, and the pure code which follows those interactions can be executed in the environment of the full range of values for the input. Note that the set of input values must include any values which affect the control flow within the pure-code segment, and should also include the values one-less-than and one-greater-than these special values.

The static analysis necessary to determine bounds-checking need not be as aggressive as whole-program-optimization. The Safe Secure method imposes upon programmers the requirement that each function contains within its calling sequence and its control flow the guarantees necessary to assure that all fetches and stores are within bounds. Therefore, no entity larger than the function need be analyzed. Furthermore, good software design suggests that "proving" that each fetch-or-store is valid should not require examination of hundreds of lines of code. If the validity is not already obvious, then the programmer should add such constructs as are required to make it obvious.

Note that the SSSA 35 must interact with the optimization analysis performed in Semantic Analyzer 34. For a non-limiting example, the analysis necessary to keep a pointer or an integer in a register ("aliasing logic") may be required to determine that that pointer or that integer retains its bounds-related attributes during specific arcs of the flow graph.

The methods described above for enforcing bounds safety have relied upon insertion by the SSCG 39 of bounds-check code segments when state analysis is unable to determine the validity of fetch-or-store accesses. In an alternative method, the SSCG 39 inserts invocations of macros or inline functions in an intermediate representation of the original program. For a non-limiting example, the following macros-or-functions can be used:

| | |
|---|---|
| __csafe__fetch__hi(p, hi) | *p if p<=hi |
| __csafe__fetch__end(p, end) | *p if p<end |
| __csafe__fetch__loh(p, lo, hi) | *p if p>=lo and p<=hi |
| __csafe__fetch__lob(p, lo, bound) | *p if p>=lo and p<lo+bound |
| __csafe__fetch__lot(p, lo, tsize) | *p if p>=lo and (char*)p<(char*)p+tsize |
| __csafe__store__hi(p, hi, val) | *p = val if p<=hi |
| __csafe__store__end(p, end, val) | *p = val if p<end |
| __csafe__store__loh(p, lo, hi, val) | *p = val if p>=lo and p<=hi |
| __csafe__store__lob(p, lo, bound, val) | *p = val if p>=lo and p<lo+bound |
| __csafe__store__lot(p, lo, tsize, val) | *p = val if p>=lo and (char*)p<(char*)p+tsize |

Alternative names can be used, avoiding conflict with other implementation-defined names while reducing the length of the name. Efficient implementation of these macros (or inline functions) will depend upon characteristics of the target implementation. The SSSA 35 ensures that the pointer arguments in the macro invocations are named variables (which may be named temporaries introduced by the SSSA 35), so that no side-effects (i.e. no increment, decrement, assignment, or function-call) are present in the macro argument expressions. In the event that p is not in-bounds, the macro behaves in accordance with the requirements specified above for Debug and non-Debug mode.

The methods shown in this section will eliminate the following undefined behaviors:

| SSM# | C-Std# | Description |
| --- | --- | --- |
| buf | c7.1.4 | The pointer passed to a library function array parameter does not have a value such that all address computations and object accesses are valid |
| buf | c6.5.6 | An array subscript is out of range, even if an object is apparently accessible with the given subscript (as in the lvalue expression a[1][7] given the declaration int a[4][5]) |
| buf | c6.5.6 | Addition or subtraction of a pointer into, or just beyond, an array object and an integer type produces a result that points just beyond the array object and is used as the operand of a unary * operator that is evaluated |
| buf | c7 | An attempt is made to copy an object to an overlapping object by use of a library function, other than as explicitly allowed (e.g., memmove) |
| buf | c6.5.8 | Pointers that do not point to the same aggregate or union (nor just beyond the same array object) are compared using relational operators |
| buf | c6.5.6 | Pointers that do not point into, or just beyond, the same array object are subtracted |
| buf | c6.5.6 | Addition or subtraction of a pointer into, or just beyond, an array object and an integer type produces a result that does not point into, or just beyond, the same array object |
| buf | c6.3.2.1 | An lvalue does not designate an object when evaluated |
| buf | c7.19.6.1, c7.24.2.1 | An s conversion specifier is encountered by one of the formatted output functions, and the argument is missing the null terminator (unless a precision is specified that does not require null termination) |
| buf | c7.19.6.2, c7.24.2.2 | A c, s, or [ conversion specifier is encountered by one of the formatted input functions, and the array pointed to by the corresponding argument is not large enough to accept the input sequence (and a null terminator if the conversion specifier is s or [) |
| buf | c7.21.1, c7.24.4 | A string or wide string utility function is instructed to access an array beyond the end of an object |

Iterative Method for Determining Requirements and Guarantees [iter]

The exemplary methods described above are implemented in the SSSA 35, which follows an interative method to be described in this section. (This section spells out in greater detail the steps described in section "Safe pointers [buf]" above.)

Each operation upon pointers, arrays, and/or subscripts may impose one or more Requirements upon the preceding operations, declarations, and/or initializations. Specific rules for inferring Requirements are shown in the Safe Secure Interface Inference Table ("SSIIT") 71. Each Requirement causes the initiation of an upward search for the Guarantee that satisfies the Requirement.

Each operation, declaration, and/or initialization may produce one or more Guarantees for subsequent operations. Each Guarantee persists across subsequent operations and statements until some subsequent event terminates the Guarantee; such events include the end of the lifetime of any objects in the Guarantee.

The steps itemized above can be performed in any order during the semantic analysis. Each time that these steps are applied to the entire translation unit the SSSA 35 must determine whether progress was made, i.e. whether any new Guarantee was determined, or whether any Requirement (not previously satisfied on previous iterations) is now satisfied. If an iteration covers the entire translation unit without making progress, then the SSSA 35 makes a list of all unsatisfied Requirements. For each such Requirement, if it is capable of link-time resolution, then entries are created in the SSBDF 26 so that it can be resolved or diagnosed at link-time. Otherwise, if the Requirement is capable of run-time prevention (using _Sat or _Modwrap or _Zerobound logic), then the SSCG 39 generates one of the appropriate code sequences as described above. If none of these link-time or run-time resolutions are available then the SSDG 37 issues a diagnostic. If the code whose Requirement cannot be satisfied occurs in a code region which can never be executed (i.e. "dead code") or is not executed in this application (i.e. "sleeper code"), then the implementation is permitted to treat the diagnostic as a warning. In any other context, the "unsatisfied Requirement" diagnostic must prevent production of object code. Furthermore, if the unsatisfied Requirement occurs in sleeper code, then the SSSA 35 makes notations in the SSBDF 26 to indicate that the code cannot be safely invoked, and the SSCG 39 generates a stub which satisfies the linkage requirements and produces safe behavior in Debug or non-Debug mode.

Any Requirement of "at least enough" or "no more than" can be satisfied by a Guarantee that is more strict than the Requirement.

These Requirement-Guarantee patterns are intended to reflect the basics, as understood by all Practitioners, of objects in machine memory, memory addressing, and aliasing rules. The patterns illustrated below are non-limiting examples.

Acknowledging the risk of redundancy, the Requirement-Guarantee patterns are itemized in the lists below. The first list itemizes the patterns that were defined in the Preliminary Application.

1. If the SSSA 35 has identified a Requirement that a pointer p is non-null, and if the current control flow proceeds from a non-null arc of a pointer test, then the non-null arc provides the necessary Guarantee.
2. If the SSSA 35 has identified a Requirement that a pointer, array, and/or subscript has attributes Qi, I, Nth, Ntl, End, Lo, or Hi, then various relevant Guarantees are found in Safe Secure Pointer Attribute Hierarchy 41 (see FIG. 7).
3. If the SSSA 35 has identified a Requirement that a pointer or array has the Nullterm attribute, then various relevant Guarantees are found in the paragraph "To determine the state transition for the Nullterm attribute" in section "States of objects [stat]".
4. If the SSSA 35 has identified a Requirement that an integer is usable as a subscript for array A, and if BOUND_OF(B)<=BOUND_OF(A), and if the integer is usable as a subscript for array B, then this provides the needed Guarantee.
5. If the SSSA 35 has identified any bounds Requirement after invocation of a C and C++ standard library function (such as "ptr=malloc(n)"), then the Guarantee may be provided by semantics of that function (such as "TSIZE_OF(ptr) is n") as specified in its entry in the SSBDF 26.
6. If the SSSA 35 has identified a bounds Requirement for a pointer which is visible to the SSSA 35 as a heap-allocated pointer, then a run-time Guarantee can be provided that uses bounds data from the argument(s) to the heap allocation.

7. If the SSSA 35 has identified any bounds Requirement for an array defined in the current translation unit, the bounds Guarantee is immediately available to the SSSA 35 from the defining declaration.
8. If the SSSA 35 has identified any bounds Requirement involving a subscript or pointer within the body of a counted-loop (counted-plus or counted-minus loop), then the bounds Guarantee is given by that counted-plus or counted-minus loop.

This second list itemizes additional patterns:
1. If the SSSA 35 has identified a Requirement that, for some limit LIM, 0<=i<LIM, and we have a bounding loop for (i=0; M*i<N; ++i), then the loop provides a Guarantee that LIM=N/M.
2. If the SSSA 35 has identified a Requirement that the Tsize of pointer p is at least N (in other words, the bytes from *p to *(p+N−1) are all within one object), and if p loops from a upwards to b, then the Requirement is satisfied for all p iff it is satisfied for the maximum value, b.
3. If the SSSA 35 has identified a Requirement that some property is true when N+c reaches its maximum value (where N is independent of c), then the Requirement is satisfied when c reaches its maximum value.

For a non-limiting example consider the following source program for a rudimentary storage allocator:

```
static char a[N];
static char *p = a;
void * my_alloc(size_t n) {
    char *ret = p;
    char *lim;
    if(n==0) n = 1;
    lim = p + n;
    if (n > N || lim > a+N) return (void*)0;
    else {
        p = lim;
        return (void*)ret;
    }
}
```

As per the definition of the iterative method, the determination of Requirements and Guarantees can proceed in any order. For a non-limiting example, start with those Requirements and Guarantees that require no flow analysis. The static declarations indicate that the Bound of a is N, and that p is initialized to the same bounds as a. The expression a+N designates the End of a. On the false ("else") arc, lim has Nth or End attribute, as determined by the SSPAPT 51, and ret has whatever attributes p had on entry to my_alloc. Then flow analysis determines that p is never decremented, that no external code can modify it (because of the file-scope static), and that it is incremented only by an unsigned value which is guaranteed not to "wrap-around" the address space. Therefore, p is never less than its initial value, the Lo of a. The function performs no fetch-or-store operations using pointers or subscripts. Therefore, the SSSA 35 needs only to determine the attributes of the returned value. On one arc the returned value is null. On the "else" arc the returned value is at least Indirectable, because p is always strictly less than a value (lim) which is Nth or End. Then the SSSA 35 determines the bounds of the returned value. The returned value is a pointer into array a, so the End of p is the End of a, but the attributes of array a are not visible outside the source file of my_alloc and therefore cannot be used to define the bounds. The only externally-visible object involved in my_alloc is the parameter n. The SSSA 35 can guarantee that the Tsize of the returned value is at least n, because p+n is at most equal to the End of a. The Tsize cannot be greater than n, because p+n can be equal to the End of a. Therefore the SSSA 35 enters into the SSBDT 61 an entry for my_alloc as follows:

QI TSIZE_IS(n) my_alloc(n)

Note that if the array a had been declared extern instead of static, the entry for my_alloc would instead specify "QI SUB4(a)". The programmer can use one of the alternative methods as defined above to indicate an intention to restrict the return attributes to "QI TSIZE_IS(n)" (or change the "extern" back to "static", of course).

As a further example consider the source code for an implementation of the standard C and C++ library function strlen:

```
size_t strlen(const char *str) {
    size_t n = 0;
    while (*p++ != '\0')
        ++n;
    return n;
}
```

Because it contains a fetch using p, the SSSA 35 determines that the Requirement upon p is at least an Indirectable requirement. Because *p is never modified (consistent with the "const" qualifier), and no de-allocation is performed upon p, the Indirectable Requirement is also a Guarantee. The pattern of the loop determines the stronger Nullterm Requirement, which is also a Guarantee. The relationship between the parameter and the returned value is also dictated by the pattern of the loop. The inference of Requirements and Guarantees produces the following entry into the SSBDT 61:

strlen(str NULLTERM LENGTH_IS(return) )

Consider a situation in which the programmer had explicitly indicated conflicting annotations; for example NULL, or QI, or TSIZE_IS(return). It is a requirement of the Safe Secure method that a diagnostic message shall be produced by the SSDG 37 to call the conflict to the attention of the programmer.

Figure 11:
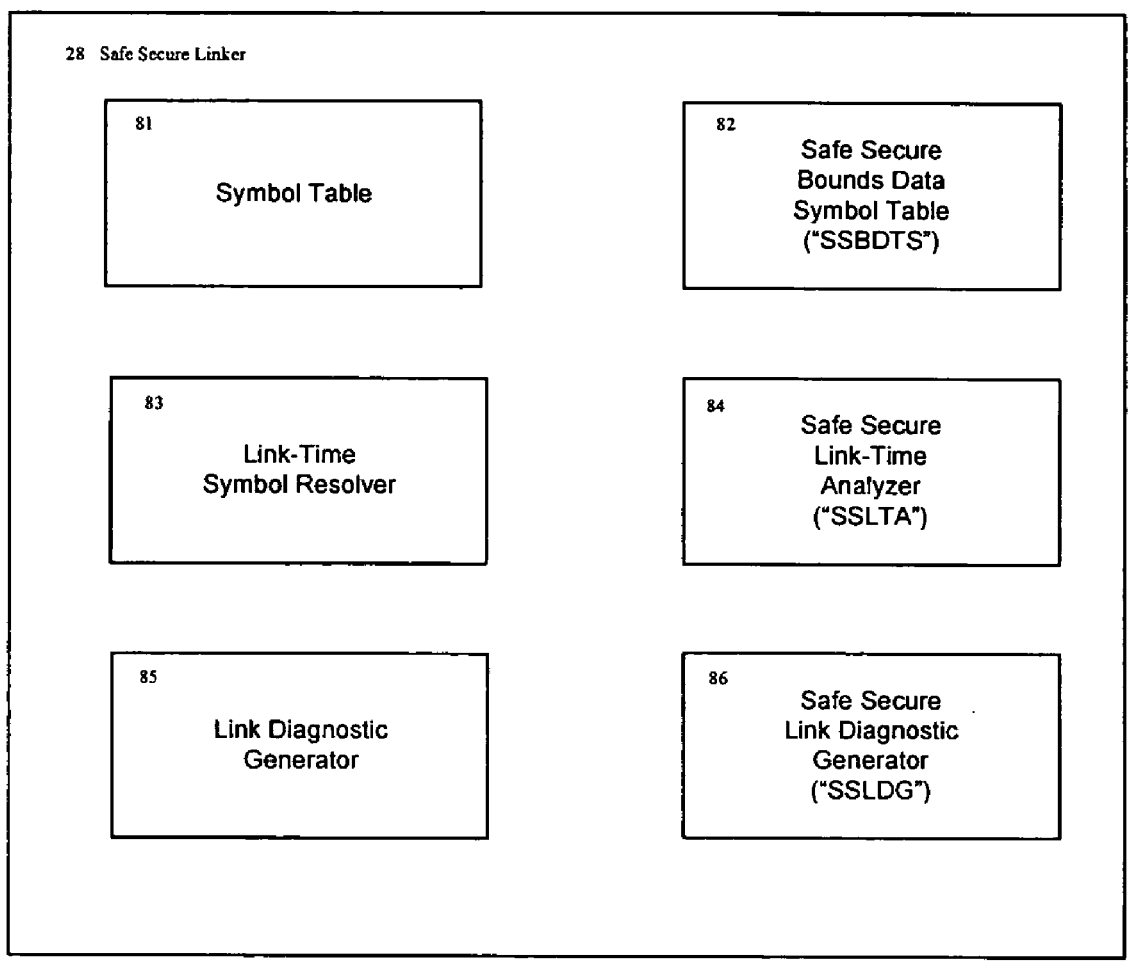
FIG. 11 shows exemplary illustrative non-limiting components of the Safe Secure Linker (SSL 28).

The components of the Safe Secure Linker are shown in FIG. 11. As is common in the art, the Safe Secure Linker ("SSL") 28 reads Object File(s) 25, creating a Symbol Table 81 of symbols provided and symbols needed. The Link-Time Symbol Resolver 83 determines the addresses of the symbols which will be loaded in the executable image. If any symbols are needed but not provided (or if typesafe linkage fails in C++), then the Link Diagnostic Generator 85 produces a message, as is customary in the common art. The Safe Secure Linker 28 provides further methods beyond the common art. Along with each Object File 25 and/or Dynamic Link-Library 27, Safe Secure Compiler 23 produced a SSBDF 26 containing Requirements and Guarantees. The Safe Secure Linker 28 reads the SSBDF(s) 26 which accompany the Object File(s) 25 being linked. Each "undefined symbol" entry in the Symbol Table 81 is augmented in the Safe Secure Bounds Data Symbol Table ("SSBDST") 82 with the Requirements and Guarantees provided by the various code contexts that require the symbol. Each "defined symbol" entry in the Symbol Table 81 is augmented augmented in the Safe Secure Bounds Data Symbol Table ("SSBDST") 82 with the Requirements and Guarantees provided by the defining instance of that symbol. The Safe Secure Link-Time Analyzer ("SSLTA") 84 performs these tests:

1. For each function-call linkage context, each Requirement of the called function is satisfied by a Guarantee in the calling function.
2. For each external array or pointer linkage context, each Requirement in one object file is satisfied by a Guarantee in the other object file.

Any unsatisfied Requirement causes a fatal diagnostic from the Safe Secure Link Diagnostic Generator ("SSLDG") 86; this prevents the production of any executable program.

As a further example we present part of the analysis of one program from the SPEC benchmarks. We chose to test the Safe Secure method with a hand-simulation on one complete application. Of the 12 different apps in SPEC CINT2000, the smallest is "256.bzip2", which contains about 4600 lines of code in two C source files (spec.c and bzip2.c). The smaller file (spec.c) contains about 36 fetch-or-store instances and the larger file (bzip2.c) contains about 250 fetch-or-store instances. The example below shows the first 8 instances of fetch-and-store operations in spec.c.

```
int spec_init ( ) {
    int i, j;
    debug(3,"spec_init\n");
    /* Clear the spec_fd structure */
    /* Allocate some large chunks of memory, we can tune this later */
    for (i = 0; i < MAX_SPEC_FD; i++) {
        int limit = spec_fd[i]/*1*/.limit;
        memset(&spec_fd[i], 0, sizeof(*spec_fd/*2*/));
        spec_fd[i].limit = limit;
        spec_fd[i].buf = (unsigned char *)malloc(limit+FUDGE_BUF);
        if (spec_fd[i].buf == NULL) {
            printf("spec_init: Error mallocing memory!\n");
            exit(1);
        }
        for (j = 0; j < limit; j+=1024) {
            spec_fd[i].buf[j]/*3*/ = 0;
        }
    }
    return 0;
}
int spec_random_load (int fd) {
    /* Now fill up the first chunk with random data, if this data is truly
       random then we will not get much of a boost out of it */
    #define RANDOM_CHUNK_SIZE (128*1024)
    #define RANDOM_CHUNKS      (32)
    /* First get some "chunks" of random data, because the gzip
       algorithms do not look past 32K */
    int i, j;
    Char random_text[RANDOM_CHUNKS][RANDOM_CHUNK_SIZE];
    debug(4,"Creating Chunks\n");
    for (i = 0; i < RANDOM_CHUNKS; i++) {
        debug1(5,"Creating Chunk %d\n", i);
        for (j = 0; j < RANDOM_CHUNK_SIZE; j++) {
            random_text[i]/*4*/[j]/*5*/ = (int)(ran( )*256);
        }
    }
    debug(4,"Filling input file\n");
    /* Now populate the input "file" with random chunks */
    for (i = 0 ; i < spec_fd[fd]/*6*/.limit; i+=RANDOM_CHUNK_SIZE) {
        memcpy(spec_fd[fd].buf + i, /*7*/
               random_text[(int)(ran( )*RANDOM_
               CHUNKS)]/*8*/,RANDOM_CHUNK_SIZE);
    }
    /* TODO-REMOVE: Pretend we only did 1M */
    spec_fd[fd].len = 1024*1024;
    return 0;
}
```

Eight instances of fetch-or-store operations are marked in the code sample above. Here is the analysis of Requirements and Guarantees for these eight marked instances:

| 1. spec_fd[i] | Requires: i IS_SUBSCRIPT_FOR(spec_fd) |
|---|---|

Searching for the Guarantee to meet this Requirement, we search up to the for-loop. The for-loop is a counted-plus which guarantees that i is less than MAX_SPEC_FD. MAX_SPEC_FD is 3, so the maximum value of i is 2, which is the highest subscript for the spec_fd array. Therefore, i IS_SUBSCRIPT_FOR(spec_fd). (We can abbreviate this as "i SUB4 (spec_fd)".) So Requirement 1 is satisfied by the counted-plus loop.

Note a series of occurrences of the same expression (spec_fd[i]) which are satisfied by the same Guarantee, so this by-hand analysis won't re-state the previous process.

| 2: *spec_fd | Requires: (nothing) |
|---|---|

This expression (*spec_fd) looks like an indirection but it isn't; it's just syntax for the size of one element of spec_fd. Because sizeof doesn't evaluate its argument, there is no fetch-or-store. Therefore, there is really no Requirement here.

| 3: spec_fd[i].buf[j] | Requires: j SUB4(buf) |
|---|---|

Search up to the for-loop. The loop is monotone increasing, so the largest value for j is limit-1. In how many places is buf initialized? Only one, 6 lines earlier. The malloc initialization guarantees that TSIZE_OF(spec_fd[i].buf) is greater than limit. So Requirement 3 is satisfied.

| 4: random_text[i] | Requires: i SUB4(random_text) |
|---|---|

This one is trivial. The "for i" loop runs i to RANDOM_CHUNKS-1, which is the Hi of random_text. So Requirement 4 is satisfied.

| 5: random_text[i][j] | Requires: j SUB4(random_text[i]) |
|---|---|

Also trivial; see the "for j" loop to the Hi of random_text[i]. Therefore Requirement 5 is satisfied.

| 6: spec_fd[fd] | Requires: fd SUB4(spec_fd) |
|---|---|

Searching upward in the spec_random_load function, nothing provides the needed Guarantee, so the Requirement becomes a Requirement of the function. Using the "bounds-data file" notation, the requirement is spec_random_load(fd SUB4(spec_fd))

It appears that this spec_random_load function is never called in this application, so this Requirement never propagates.

| 7: memcpy(-, -, RANDOM_CHUNK_SIZE) | Requires: see below |
|---|---|

The "bounds-data" file entry for memcpy will look like this:

memcpy(s, p, n IS_TSIZE_OF((s,p)))

Therefore, there are two parts to this Requirement 7:

Requirement 7a: TSIZE_OF(spec_fd[fd].buf+i) is RANDOM_CHUNK_SIZE

Requirement 7b: TSIZE_OF(random_text[(int)(ran( )*RANDOM_CHUNKS)]) is RANDOM_CHUNK_SIZE The Tsize of the first argument is the number of bytes from spec_fd[fd].buf+i to the last byte of spec_fd[fd].buf. This number of bytes reaches its minimum (its tightest constraint) when spec_fd[buf]+i reaches its maximum value. The maximum value of spec_fd[fd].buf+i is reached when i reaches its maximum value, namely spec_fd[fd].limit. The relationship between spec_fd[fd].buf and spec_fd[fd].limit is established in the function spec_init: TSIZE_OF(spec_fd[i].buf) is spec_fd[i].limit+FUDGE_BUF.

Therefore Requirement 7a is equivalent to spec_fd[i].limit + RANDOM_CHUNK_SIZE <= spec_fd[i].limit +FUDGE_BUF which simplifies to

RANDOM_CHUNK_SIZE <= FUDGE_BUF

But RANDOM_CHUNK_SIZE is 128*1024, and FUDGE_BUF is 100*1024. Therefore Requirement 7a cannot be satisfied without changes to the source code. (For example, FUDGE_BUF could be increased to the same value as RANDOM_CHUNK_SIZE.) Note that this unsatisfiable Requirement occurs inside "sleeper code", i.e. code which is not executed in this application. A compiler which is being tested by SPEC would in all likelihood not give fatal diagnostics for dead code and sleeper code, and would compile and execute the application despite the unsatisfiable Requirement 7a in the sleeper-code function spec_random_load. The resulting executable program is still certifiably free from buffer overflows.

The Tsize of each row of the random_text array is RANDOM_CHUNK_SIZE, as given by the declaration of random_text; therefore Requirement 7b is trivially satisfied.

| 8: random_text [(int)(ran( )*RANDOM_CHUNKS)] | Requirement: see below |
|---|---|

Requirement 8 is that (int)(ran( )*RANDOM_CHUNKS) must be usable as a subscript for random_text; i.e.

(int)(ran( )*RANDOM_CHUNKS SUB4(random_text).

From the declaration of random_text, its Bound is RANDOM_CHUNKS. Therefore Requirement 8 requires 0<=(int)(ran( )*RANDOM_CHUNKS)<RANDOM_CHUNKS or 0<=ran( )<1.0

This imposes a Requirement upon the ran( ) function (not shown in this example). Determining at compile-time that ran( ) actually produces a non-negative result smaller than 1.0 is beyond the scope of the Safe Secure Requirement-Guarantee patterns at compile time. Therefore the Safe Secure Compiler 23 must analyze the options for run-time checking, namely _Sat, _Modwrap, and _Zerobound. Let T1 designate the temporary result of calculating the subscript (int)(ran ( )*RANDOM_CHUNKS). Since RANDOM_CHUNKS is a constant (32), the code generation for the run-time checking is as follows:

| _Sat | random_text[0 > T1 ? 0 : (31 < T1 : 31 : T1)] |
|---|---|
| _Modwrap | random_text[T1 % 32] |
| _Zerobound | (0 > T1 : dummy : (31 < T1 : dummy : random_text[T1]) |

Since this particular example arises in a SPEC benchmark, the compiler will probably favor optimization for speed. Because the modulus is a constant power of two, the compiler will in all likelihood recognize a special-case pattern in the _ Modwrap alternative and generate the platform-dependent optimized version, which typically looks like random_text [T1 & 0x1F].

Bitwise Manipulation of Pointers [bitp]

If the low-order bits of a pointer are masked OFF or ON by a compile-time constant mask, and if that mask specifies a value smaller than the alignment requirement of the pointed-to type, then the pointer-bound-state of the pointer is not altered thereby. In all other cases, the pointer-bound-state of the pointer is indeterminate (Unk) after manipulation. Reading a pointer from external store (via % p, fread, or other method) produces the indeterminate pointer-bound-state The range of unsigned integer values can in one exemplary implementation be sufficient to represent the difference of any two pointers, as well as sufficient to represent unambiguously the value of any pointer.

| SSM# | C-Std# | Description |
|---|---|---|
| bitp | c6.3.2.3 | Conversion of a pointer to an integer type produces a value outside the range that can be represented |
| bitp | c7.19.6.2, c7.24.2.2 | The input item for a % p conversion by one of the formatted input functions is not a value converted earlier during the same program execution |

Variable Argument List Checking [varg]

A compiler 23 configured for the Safe Secure method can in one exemplary illustrative non-limiting implementation produce special assistance for invocation of functions declared with ellipsis ("variable-argument functions"). At each invocation, the Safe Secure Compiler 23 is aware of the promoted types of the actual arguments, and can in one exemplary implementation produce a null-terminated string containing the name-mangled representation of the promoted arguments. (For a description of a typical name-mangling algorithm, see e.g., Mark Mitchell et al., "Itanium C++ ABI" (http://www.codesourcery.com/cxx-abi/abi.html)) The Safe Secure Compiler 23 can in one exemplary implementation provide special handling of the va_arg macro as defined in header <stdarg.h> as follows: If the type argument is a scalar type which produces a one-byte encoding in the mangled name string (e.g. double, which produces the single character 'd' in typical name-mangling, then an invocation such as p = va_arg(ap, double);

produces a translated invocation such as p = __va_arg3(ap, double, 'd');

The enhanced _va_arg3 macro can in one exemplary implementation test that the next byte in the argument mangled-name string is the character 'd', incrementing the pointer after the test. If the test is false, an associated "match" function is invoked, such as __va_arg__double__match(&ap);

The rules for type-matching for variable-argument functions permit more matches than the strict same-type rules of C++; refer to section [tsl]. If the argument mangled-name character fails the type-matching rules described there, then a run-time error is reported by using the ss_unwind function.

The methods shown in this section will eliminate the following undefined behaviors:

| SSM# | C-Std# | Description |
|------|--------|-------------|
| varg | c7.15.1.1 | The va_arg macro is invoked when there is no actual next argument, or with a specified type that is not compatible with the promoted type of the actual next argument, with certain exceptions |
| varg | c7.15 | The macro va_arg is invoked using the parameter ap that was passed to a function that invoked the macro va_arg with the same parameter |
| varg | c7.15.1.4 | The va_start macro is called to initialize a va_list that was previously initialized by va_start (or va_copy in c99) without an intervening invocation of the va_end macro for the same va_list |
| varg | c7.19.6.8, c7.19.6.9, c7.19.6.10, c7.19.6.11, c7.19.6.12, c7.19.6.13, c7.19.6.14, c7.24.2.5, c7.24.2.6, c7.24.2.7, c7.24.2.8, c7.24.2.9, c7.24.2.10 | The vfprintf, vfscanf, vprintf, vscanf, vsnprintf, vsprintf, vsscanf, vfwprintf, vfwscanf, vswprintf, vswscanf, vwprintf, or vwscanf function is . . . |
| varg | c7.19.6.8, c7.19.6.9, c7.19.6.10, c7.19.6.11, c7.19.6.12, c7.19.6.13, c7.19.6.14, c7.24.2.5, c7.24.2.6, c7.24.2.7, c7.24.2.8, c7.24.2.9, c7.24.2.10 | . . . called with an improperly initialized va_list argument, or the argument is used (other than in an invocation of va_end) after the function returns |

Type-secure Linkage [tsl]

In the Safe Secure method, C functions are type-checked using an implementation mechanism similar to that used for C++. This does not introduce overloading in C; the underlying function-name identifier must be unique for each C function. The rules for matching the type of C functions also permit linkage of functions whose signature differs from the expected type by the rules of "same representation and alignment" (see [R13] 6.2.5). For example, on many implementations, the representation of the long double type is actually the same representation as the double type, i.e., a 64-bit floating point representation. The test for "same representation and alignment" extends to pointers, both for the pointer value itself and for the type pointed-to. Pointer-to-character (signed, unsigned, or unspecified) is compatible with pointer-to-void. The reason for using the relaxed rules of "same representation and alignment" rather than the strict "same type" rules is to avoid negative responses from today's C and C++ programmers, who are currently accustomed to "practical" rather than "pedantic" standards for proper behavior of variable-argument functions. Portability is often important, but portability cannot over-ride the requirements of safety and security. (An alternate name for "type-secure linkage" is "type-compatible linkage".)

The type-secure linkage rules apply to data as well as to functions.

The methods shown in this section will eliminate the following undefined behaviors:

| SSM# | C-Std# | Description |
|------|--------|-------------|
| tsl | c6.2.7 | Two declarations of the same object or function specify types that are not compatible |
| tsl | c6.3.2.3 | A pointer is used to call a function whose type is no compatible with the pointed-to type |
| tsl | c6.5.2.2 | A function is defined with a type that is not compatible with the type |
| tsl | c6.9 | An identifier with external linkage is used, but in the program there does not exist exactly one external definition for the identifier, or the identifier is not used and there exist multiple external definitions for the identifier |
| tsl | c7.1.4 | An argument to a library function has an invalid value or a type not expected by a function with variable number of arguments |

Mode Strings for fopen [fopen]

If at compile-time the string pointed to by the mode argument in a call to the fopen function does not exactly match one of the expected character sequences a fatal diagnostic message can be produced. If the error occurs at run-time in Debug mode, ss_unwind can be invoked; the implementation may throw an exception of an implementation-defined type. If the error occurs at run-time in non-Debug mode, the implementation can ignore all unrecognized portions of the mode argument.

The methods shown in this section will eliminate the following undefined behaviors:

| SSM# | C-Std# | Description |
| --- | --- | --- |
| fopen | c7.19.5.3 | The string pointed to by the mode argument in a call to the fopen function does not exactly match one of the specified character sequences |

Safety and security are compromised when compiler components (such as system header files) do not contain the approved un-modified sources as released and installed. The Safe Secure method requires that the Safe Secure Compiler 23 provides one menu choice, or one command-line invocation, which tells the user whether the components of the Safe Secure Compiler 23 (including executable programs, library object files, and system headers) have been altered (whether deliberately or inadvertently) from their initial state as delivered. The specific mechanism for such verification is left to the vendor's choice, and several mechanisms (such as checksums and digital signatures) are well-known in the current art. Furthermore, during each compilation, the first time each header (or other component) is opened for reading, the same checking of that header takes place. The same checking is also performed for all library components referenced at link-time.

The Safe Secure Compiler 23 produces the Safe Secure Inputs Check-List ("SSICL") 24, a list of the file-names (or equivalent designation) of all the source components which were read by the compiler during the compilation of one or more outputs. In addition to each file-name, the SSICL 24 also contains one or more checksums for the contents of the corresponding component. (The term "check-list" is used here to designate a list of names and checksums.) At least one of the checksums embodies the following method of forming the checksum:

1. Text files represented in ASCII, ISO 646, ISO 8859-1 ("Latin-1"), or the UTF-8 encoding of Unicode or ISO 10646, are checksummed using the values of that encoding. Otherwise, each text file is converted to the UTF-8 form of ISO 10646 before checksumming.
2. Each sequence of whitespace (except in literals) is replaced by one Space character before checksumming.
3. On each instance of the word "return" (except in double-quoted string literals) followed by one or more occurrences of the Space character or the Open Parenthesis character, any parentheses around the returned expression are removed before forming the checksum.
4. No other transformations are applied to the source characters.

The SSBDF 26 contains a similar check-list listing each output file produced by the compiler (object file, executable file, or dynamic link-library), together with one or more checksums. At least one of the checksums embodies the method given above, using the actual 8-bit value of each byte as an unsigned character value (from 0 to 255). This check-list includes one entry designating the SSICL 24, including the one-or-more checksums formed in the same way as specified above for the entries contained in the SSICL 24.

Also contained in the SSBDF 26 is a list of checksums known as the Compilation Signature, formed as follows. At the $N^{th}$ occurrence of a compiler operation specified by the Safe Secure method (e.g., the inference of an attribute, or the satisfying of a Requirement by a Guarantee), the SSC 23 forms a checkum of the operand(s) of that operation. This checksum is stored as the first entry on the Compilation Signature list. Repeat this process at the $2*N^{th}$ operation, the $4*N^{th}$ operation, the $8*N^{th}$ operation, etc. The resulting list of checksums in the Compilation Signature is of a size roughly proportional to the base-2 logarithm of the program size. This Compilation Signature provides a record of the compilation of a specific program by a specific Safe Secure Compiler 23.

Format Strings for printf, scanf, strftime Functions [fmt]

If at compile-time the string pointed to by the format argument in a call to any of the printf/scanf functions does not match the number and types of the actual arguments, a fatal diagnostic message can be produced (as is well-known in current art). If the format string is a run-time character string (i.e., not a compile-time string), no additional argument-checking is required beyond the type-checking performed for variable argument lists (see section "Variable argument list checking [varg]").

If at compile-time the string pointed to by the format argument in a call to the strftime function does not exactly match one of the expected character sequences a fatal diagnostic message can be produced. If the error occurs at run-time, ss_unwind can be invoked; the implementation may throw an exception of an implementation-defined type.

The methods shown in this section will eliminate the following undefined behaviors:

| SSM# | C-Std# | Description |
| --- | --- | --- |
| fmt | c7.19.6.1, c7.19.6.2, c7.23.3.5, c7.24.2.1, c7.24.2.2, c7.24.5.1 | An invalid conversion specification is found in the format for one of the formatted input, coutput functions, or the strftime or wcsftime function |
| fmt | c7.19.6.1, c7.19.6.2, c7.24.2.1, c7.24.2.2 | An n conversion specification for one of the formatted input, coutput functions includes any flags, an assignment-suppressing character, a field width, or a precision |
| fmt | c7.19.6.1, c7.19.6.2, c7.24.2.1, c7.24.2.2 | There are insufficient arguments for the format in a call to one of the formatted input, coutput functions, or an argument does not have an appropriate type |
| fmt | c7.19.6.1, c7.19.6.2, c7.24.2.1, c7.24.2.2 | A conversion specification for one of the formatted input, coutput functions uses a length modifier with a conversion specifier other than those described |
| fmt | c7.19.6.1, c7.24.2.1 | A conversion specification for a formatted output function uses an asterisk to denote an argument-supplied field width or precision, but the corresponding argument is not provided |
| fmt | c7.19.6.1, c7.24.2.1 | In a call to one of the formatted output functions, a precision appears with a conversion specifier other than those described |
| fmt | c7.19.6.1, c7.24.2.1 | A conversion specification for a formatted output function uses a # or 0 flag with a conversion specifier other than those described |
| fmt | c7.19.6.2, c7.24.2.2 | The result of a conversion by one of the formatted input functions cannot be represented in the corresponding object, or the receiving object does not have an appropriate type |

Function Invocation Patterns [invoc]

Some functions in the standard C and C++ library return nothing (the "void" functions). Other functions always return a value with no success-or-fail status information. Some functions return a value which provides status information. The C library exhibits a rather inconsistent set of status-returning patterns. Here is a list of the various patterns of status-returns for standard C and C++ functions:

a. boolean (non-zero is success): setjmp, the character classification functions (7.1.4), feof, ferror, mblen(with null s), mbtowc(with null s), wctomb(with null s), mbsinit, wide character classification functions (7.25.2.1)
b. null is failure: setlocale, tmpfile, tmpnam, fopen, freopen, fgets, gets, calloc, malloc, realloc, getenv, bsearch, memchr, strchr, strpbrk, strrchr, strstr, strtok, gmtime, localtime, fgetws, wcschr, wcspbrk, wcsrchr, wcsstr, wcstok, wmemchr
c. SIG_ERR is failure: signal
d. zero is success: raise, rename, fclose, setvbuf, fgetpos, fseek, fsetpos, atexit
e. EOF is failure: fflush, fgetc, fputc, fputs, getc, getchar, putc, putchar, puts, ungetc, fputws, wctob
f. negative is failure: fprintf, printf, sprintf, vfprintf, vprintf, vsprintf, fwprintf, swprintf, vfwprintf, vswprintf, vwprintf, wprintf
g. number of items transmitted: fscanf, scanf, sscanf, vfscanf, vscanf, vsscanf, fread, fwrite, fwscanf, swscanf, vfwscanf, vswscanf, vwscanf, wscanf
h. nonnegative and less than n: snprintf, vsnprintf
i. negative one is failure: ftell, mblen(with non-null s), mbtowc(with non-null s), wctomb(with non-null s), mbstowcs, wcstombs, clock, mktime, time, wcrtomb, mbsrtowcs, wcsrtombs
j. high-low-equal: memcmp, strcmp, strcoll, strncmp, fwide, wcscmp, wcscoll, wcsncmp, wmemcmp
k. greater than n is failure: strxfrm, wcsxfrm
l. [reserved—no L]
m. zero is failure: strftime, wcsftime
n. WEOF is failure: fgetwc, fputwc, getwc, getwchar, putwc, putwchar, ungetwc, btowc
o. minus two through n: mbrlen, mbrtowc In each of the calling contexts listed above, there is a special "comparison value" against which the returned value should be tested. For cases 1, 2, 4, 6, 10, and 12, the comparison value is zero. For case 3, the comparison value is SIG_ERR. For case 5, the comparison value is EOF. For cases 7 and 11, the comparison value is a value unambiguously determined by the list of arguments. For case 8, the comparison value can be either zero or a value unambiguously determined by the list of arguments. For case 13, the comparison value is WEOF. For case 14, the comparison value can be −2, or −1, or a value unambiguously determined by the list of arguments.

There are several calling contexts which will meet the requirements listed above:

a. A conditional control-flow test (if, while, for, switch, or logical operator) which explicitly or implicitly tests the returned value against the appropriate comparison value.
b. Assignment of the returned value to some object, after which the first conditional control-flow test is a test that matches the preceding context (#1).

This determination of proper calling context can in one exemplary implementation also be made available for user-written functions by providing to user programs a macro such as __CALLED_LIKE(name).

If the function is called properly, then error returns are handled normally, without incurring additional run-time overhead in the calling or called function. In Debug mode, if the function was not called properly, extra code is generated in the calling function such that a failure return causes an ss_unwind with a descriptive string argument. In non-Debug mode, in all cases where execution can continue without causing fetch-or-store errors, then execution continues without interruption; otherwise a fatal diagnostic is produced at compile-time. The cases where a fatal diagnostic is produced in non-Debug mode are specified below:

a. boolean (non-zero is success): none
b. null is failure: getenv. (Note that FILE* pointer parameters are required to have the "indirectable" attribute in CSAFE mode, so passing "maybe-indirectable" FILE* variables will be diagnosed at compile time. Similarly, pointer returns from allocation and searching functions do not demand immediate null-testing, because the "maybe-indirectable" attribute will require null-testing before later indirecting.)
c. SIG_ERR is failure: none
d. zero is success: atexit (Note: most I/O failures may produce erroneous results but do not cause fetch-or-store errors.)
e. EOF is failure: none (Note: most I/O failures may produce erroneous results but do not cause fetch-or-store errors.)
f. negative is failure: none (Note: most I/O failures may produce erroneous results but do not cause fetch-or-store errors.)
g. number of items transmitted: snprintf, sprintf, vsprintf (Note: most I/O failures may produce erroneous results but do not cause fetch-or-store errors.)
h. nonnegative and less than n: none (Note: most I/O failures may produce erroneous results but do not cause fetch-or-store errors.)
i. negative one is failure: mktime
j. high-low-equal: none
k. greater than n is failure: strxfrm, wcsxfrm
l. [reserved—no L]
m. zero is failure: strftime, wcsftime
n. WEOF is failure: none
o. minus two through n: : none Compile-time Diagnosis [ct]

Many of the situations labeled as "undefined behavior" are capable of diagnosis by the compiler. In the methods presented here, the cases identified by the code "ct" in column one result in the production of a fatal diagnostic message by the Safe Secure Compiler 23. Furthermore, production of a fatal diagnostic message prevents the Safe Secure Compiler 23 from producing a translated file.

The C standard defines a diagnostic message as follows: "3.10 diagnostic message: message belonging to an implementation-defined subset of the implementation's message output".

The methods shown in this section will eliminate the following undefined behaviors:

| SSM# | C-Std# | Description |
| --- | --- | --- |
| ct | c6.5.2.2 | For a call to a function without a function prototype in scope where the function is defined with a function prototype, . . . |
| ct | c6.5.2.2 | . . . either the prototype ends with an ellipsis or the types of the arguments after promotion are not compatible with the types of the parameters |

-continued

| SSM# | C-Std# | Description |
|---|---|---|
| ct | c6.10.6 | A non-STDC #pragma preprocessing directive that is documented as causing translation failure or some other form of undefined behavior is encountered |
| ct | c6.5.2.2 | For a call to a function without a function prototype in scope where the function is not defined with a function prototype, the types of the arguments after promotion are not compatible with those of the parameters after promotion |
| ct | c6.5.2.2 | For a call to a function without a function prototype in scope, the number of arguments does not equal the number of parameters |
| ct | c6.5.2.2, c6.5.15, c6.5.16, c6.5.17 | An attempt is made to modify the result of a function call, a conditional operator, an assignment operator, or a comma operator, or to access it after the next sequence point |
| ct | c7.1.2 | A file with the same name as one of the standard headers, not provided as part of the implementation, is placed in any of the standard places that are searched for included source files |
| ct | c7.1.2 | A function, object, type, or macro that is specified as being declared or defined by some standard header is used before any header that declares or defines it is included |
| ct | c7.1.2 | A standard header is included while a macro is defined with the same name as a keyword |
| ct | c7.1.2 | The program attempts to declare a library function itself, rather than via a standard header, but the declaration does not have external linkage |
| ct | c7.1.3 | The program declares or defines a reserved identifier, other than as allowed by 7.1.4 |
| ct | c7.1.3 | The program removes the definition of a macro whose name begins with an underscore and either an uppercase letter or another underscore |
| ct | c7.12 | A macro definition of math_errhandling is suppressed or the program defines an identifier with the name math_errhandling |
| ct | c7.13 | A macro definition of setjmp is suppressed in order to access an actual function, or the program defines an external identifier with the name setjmp |
| ct | c7.13.2.1 | An invocation of the setjmp macro occurs other than in an allowed context |
| ct | c7.14.1.1 | The program specifies an invalid pointer to a signal handler function |
| ct | c7.15, c7.15.1.1, c7.15.1.4 | A function with a variable number of arguments attempts to access its varying arguments other than through a properly declared and initialized va_list object, or before the va_start macro is invoked |
| ct | c7.15.1 | A macro definition of va_start, va_arg, va_copy, or va_end is suppressed in order to access an actual function, or the program defines an external identifier with the name va_copy or va_end |
| ct | c7.15.1, c7.15.1.2, c7.15.1.3, c7.15.1.4 | The va_start or va_copy macro is invoked without a corresponding invocation of the va_end macro in the same function, or vice versa |
| ct | c7.15.1.1 | The type parameter to the va_arg macro is not such that a pointer to an object of that type can be obtained simply by postfixing a * |
| ct | c7.15.1.4 | The parameter parmN of a va_start macro is declared with the register storage class, with a function or array type, or with a type that is not compatible with the type that results after application of the default argument promotions |
| ct | c7.2 | The macro definition of assert is suppressed in order to access an actual function |
| ct | c7.5 | A macro definition of errno is suppressed in order to access an actual object, or the program defines an identifier with the name errno |

Conditionally-defined Behaviors [cdef]

Many of the situations defined as undefined behavior could be more precisely delineated by permitting a reduced range of the alternatives (as has been described in various places in the current art). The method described here requires the Safe Secure Compiler 23 to implement a choice for each behavior: either produce a fatal diagnostic message, or produce a specified implementation-defined behavior, for each of the situations coded with "cdef" in column one of the following table.

The methods shown in this section will eliminate the following undefined behaviors:

| SSM# | C-Std# | Description |
|---|---|---|
| cdef | c5.1.1.2 | A nonempty source file does not end in a new-line character which is not immediately preceded by a backslash character or ends in a partial preprocessing token or comment |
| cdef | c6.6 | A constant expression in an initializer is not, or does not evaluate to, one of the following: an arithmetic constant expression, . . . |
| cdef | c6.6 | . . .a null pointer constant, an address constant, or an address constant for an object type plus or minus an integer constant expression |
| cdef | c6.6 | An arithmetic constant expression does not have arithmetic type; has operands that are not integer constants, floating constants, . . . |
| cdef | c6.6 | . . . enumeration constants, character constants, or sizeof expressions; or contains casts (outside operands to sizeof operators) other than conversions of arithmetic types to arithmetic types |
| cdef | c6.6 | An expression that is required to be an integer constant expression does not have an integer type; has operands that are not integer constants, enumeration constants, character constants, sizeof expressions whose results are integer constants, or . . . |
| cdef | c6.6 | . . . sizeof expressions whose results are integer constants, or immediately-cast floating constants; or contains casts (outside operands to sizeof operators) other than conversions of arithmetic types to integer types |
| cdef | c6.7.5.3 | In a context requiring two function types to be compatible, they do not have compatible return types, or . . . |
| cdef | c6.7.5.3 | . . . their parameters disagree in use of the ellipsis terminator or the number and type of parameter (after default argument promotion, when there is no parameter type list or when one type is specified by a function definition with an identifier list) |

-continued

| SSM# | C-Std# | Description |
|---|---|---|
| cdef | c5.1.1.2 | A nonempty source file does not end in a new-line character which is not immediately preceded by a backslash character . . . |
| cdef | c5.1.1.2 | A nonempty source file . . . or ends in a partial preprocessing token |
| cdef | c5.1.1.2 | Token concatenation produces a character sequence matching the syntax of a universal character name |
| cdef | c5.1.2.2.1 | A program in a hosted environment does not define a function named main using one of the specified forms |
| cdef | c5.2.1 | A character not in the basic source character set is encountered in a source file, except in an identifier, a character constant, a string literal, a header name, a comment, or a preprocessing token that is never converted to a token |
| cdef | c5.2.1.2 | An identifier, comment, string literal, character constant, or header name contains an invalid multibyte character or does not begin and end in the initial shift state |
| cdef | c6.10.1 | The token defined is generated during the expansion of a #if or #elif preprocessing directive, or the use of the defined unary operator does not match one of the two specified forms prior to macro replacement |
| cdef | c6.10.2 | The #include preprocessing directive that results after expansion does not match one of the two header name forms |
| cdef | c6.10.2 | The character sequence in an #include preprocessing directive does not start with a letter |
| cdef | c6.10.3 | There are sequences of preprocessing tokens within the list of macro arguments that would otherwise act as preprocessing directives |
| cdef | c6.10.3.2 | The result of the preprocessing operator # is not a valid character string literal |
| cdef | c6.10.3.3 | The result of the preprocessing operator ## is not a valid preprocessing token |
| cdef | c6.10.4 | The #line preprocessing directive that results after expansion does not match one of the two well-defined forms, or its digit sequence specifies zero or a number greater than 2147483647 |
| cdef | c6.10.6 | A #pragma STDC preprocessing directive does not match one of the well-defined forms |
| cdef | c6.10.8 | The name of a predefined macro, or the identifier defined, is the subject of a #define or #undef preprocessing directive |
| cdef | c6.2.2 | The same identifier has both internal and external linkage in the same translation unit |
| cdef | c6.2.6.2 | The arguments to certain operators are such that could produce a negative zero result, but the implementation does not support negative zeros |
| cdef | c6.3.2.1 | A non-array lvalue with an incomplete type is used in a context that requires the value of the designated object |
| cdef | c6.3.2.1 | An lvalue having array type is converted to a pointer to the initial element of the array, and the array object has register storage class |
| cdef | c6.3.2.2 | An attempt is made to use the value of a void expression, or an implicit or explicit conversion (except to void) is applied to a void expression |
| cdef | c6.3.2.3 | Conversion between two pointer types produces a result that is incorrectly aligned |
| cdef | c6.4 | An unmatched ' or character is encountered on a logical source line during tokenization |
| cdef | c6.4.1 | A reserved keyword token is used in translation phase 7 or 8 for some purpose other than as a keyword |
| cdef | c6.4.2.1 | A universal character name in an identifier does not designate a character whose encoding falls into one of the specified ranges |
| cdef | c6.4.2.1 | The initial character of an identifier is a universal character name designating a digit |
| cdef | c6.4.2.1 | Two identifiers differ only in nonsignificant characters |
| cdef | c6.4.2.2 | The identifier ___func___ is explicitly declared |
| cdef | c6.4.7 | The characters ', \,, , c, c, or , c* occur in the sequence between the < and > delimiters, or the characters ', \, , c, c, or , c* occur in the sequence between the delimiters, in a header name preprocessing token |
| cdef | c6.5.4 | A pointer is converted to other than an integer or pointer type |
| cdef | c6.6 | The value of an object is accessed by an array-subscript [ ], member-access . or −>, address &, or indirection * operator or a pointer cast in creating an address constant |
| cdef | c6.7 | An identifier for an object is declared with no linkage and the type of the object is incomplete after its declarator, or after its init-declarator if it has an initializer |
| cdef | c6.7.1 | A function is declared at block scope with an explicit storage-class specifier other than extern |
| cdef | c6.7.2.1 | A structure or union is defined as containing no named members |
| cdef | c6.7.2.3 | When the complete type is needed, an incomplete structure or union type is not completed in the same scope by another declaration of the tag that defines the content |
| cdef | c6.7.3 | The specification of a function type includes any type qualifiers |
| cdef | c6.7.3 | Two qualified types that are required to be compatible do not have the identically qualified version of a compatible type |
| cdef | c6.7.5.1 | Two pointer types that are required to be compatible are not identically qualified, or are not pointers to compatible types |
| cdef | c6.7.5.2 | In a context requiring two array types to be compatible, they do not have compatible element types, or their size specifiers evaluate to unequal values |

-continued

| SSM# | C-Std# | Description |
|---|---|---|
| cdef | c6.7.5.2 | The size expression in an array declaration is not a constant expression and evaluates at program execution time to a nonpositive value |
| cdef | c6.7.5.3 | A storage-class specifier or type qualifier modifies the keyword void as a function parameter type list |
| cdef | c6.7.8 | The initializer for a scalar is neither a single expression nor a single expression enclosed in braces |
| cdef | c6.7.8 | The initializer for a structure or union object that has automatic storage duration is neither an initializer list nor a single expression that has compatible structure or union type |
| cdef | c6.7.8 | The initializer for an aggregate or union, other than an array initialized by a string literal, is not a brace-enclosed list of initializers for its elements or members |
| cdef | c6.9.1 | A function definition includes an identifier list, but the types of the parameters are not declared in a following declaration list |
| cdef | c6.9.1 | A function that accepts a variable number of arguments is defined without a parameter type list that ends with the ellipsis notation |
| cdef | c6.9.1 | An adjusted parameter type in a function definition is not an object type |
| cdef | c6.9.2 | An identifier for an object with internal linkage and an incomplete type is declared with a tentative definition |
| cdef | c7.1.2 | A header is included within an external declaration or definition |
| cdef | c7.2 | The argument to the assert macro does not have a scalar type |
| cdef | c7__17 | The member designator parameter of an offsetof macro is an invalid right operand of the . operator for the type parameter, or designates a bit-field |
| cdef | c7__18.4 | The argument in an instance of one of the integer-constant macros is not a decimal, octal, or hexadecimal constant, or it has a value that exceeds the limits for the corresponding type |

Big Safe Pointers [bsafe]

This section presents an alternative to the compile-time-safe ("CSAFE") pointers defined in the sections "States of objects [stat]" and "Safe pointers [buf]". In this alternative, all pointers are implemented as "big-safe pointers" (or "BSAFE" pointers) using a struct containing three ordinary pointers (each represented as a pointer to an underlying type T). The methods shown in this section provide an alternative mechanism to address the undefined behaviors that are listed above in the section "Safe pointers [buf]".

In one specific implementation, the big-safe-pointer mechanism is achieved by transforming the C or C++ source program into a C++ program in which each big-safe pointer is implemented as a template struct:

```
template <class T> struct bsafe_ptr {T* ptr; T* lo; T* hi;};
```

Thus, every big-safe pointer will include low and high bounds information.

In an alternative embodiment, the high-bound information is represented as a Tsize-adjusted field. The Bound is defined as the Tsize divided by the size of the type T to which the pointer is pointing. The Tsize-adjusted is the Tsize minus the size of the type T, i.e. the number of bytes in the array between the address of the first object of type T and the last object of type T. If there is only one element in the array, the Tsize-adjusted is zero.

In order to make a copy of a bsafe_ptr, we provide a clone(T*p) member:

```
bsafe_ptr<T> clone(T*p) {
    bsafe_ptr<T>* ret = new bsafe_ptr<T>(p,lo,hi);
    if (Debug && p > hi+1) {
        delete ret;
        ss_unwind("bsafe_ptr out of range: clone \n");
```

-continued

```
    }
    ret->ptr=p; ret->lo=lo; ret->hi=hi;
    return *ret;
}
```

Since the initial target language is the intersection of C and C++, we want to map the semantics of big-safe-pointers into a macro-compatible syntax:

```
#define LO__OF(p) ((p).clone ((p).lo))
#define HI__OF(p) ((p).clone ((p).hi)
#define END__OF(p) ((p).clone ((p)+BOUND_OF (p)))
#define BOUND__OF(p) (TSIZE__OF (p)/sizeof((*p)))
#define TSIZE__OF(p) ((size__t) ((p).ts) + sizeof(*(p)))
```

In other words, END_OF(p) is a bsafe pointer with the same Lo and Hi values as p and containing the "one-too-far" address as its current ptr value. Similarly, LO_OF(p) is a bsafe pointer with the same Lo and Hi values as p and containing p.lo as its current ptr value. The BOUND_OF(p) is an integer designating the number of elements in the array that extends from LO_OF(p) to HI_OF(p). The TSIZE_OF(p) ("target size of p") is the number of bytes in the storage accessed through p.

We define the Lo-Hi information, or Lo-Hi bounds, as the information embodied in the lo and hi fields.

A pointer value that designates an object in an array includes the bounding addresses of the array. Assigning a pointer value to a pointer object preserves the lo, hi, and ptr members. Creating a pointer via the big-safe version of malloc(N) produces a bsafe_ptr containing the ptr address of the new storage, a lo equal to ptr, and a hi of N/ sizeof(T). Casting a bsafe_ptr, for example from char* to T*, converts ptr and lo to T* values; if ptr or lo are not properly aligned, an ss_unwind is raised.

Pointer arithmetic (ptr+n, ptr−n, ptr−ptr, ptr[n]) and fetch-and-store indirection operators (explicitly via "star" or implicitly in the lvalue use of subscript) are checked and diagnosed according to the rules as described in section "Safe pointers [buf]", with the obvious inclusion of run-time checking against the values store in the big-safe-pointer.

Note that the first member of a bsafe_ptr is the pointer value ptr. This is intentional and required; any non-BSAFE code which refers to a bsafe_ptr as an ordinary pointer will properly address the pointer value.

In the big-safe-pointer alternative, all external pointers have bsafe_ptr representation. In particular, any system-defined external pointers (such as environ) have bsafe_ptr representation. (The cost is only two extra words per external pointer.)

There are a few application niches which might conceivably use only big-safe pointers, such as the training of programmers, the creation of user-provided callback functions, the production of specialized "one-off" prototypes, etc. All are areas that might be willing to trade some time and space for greatly increased reliability. However, most application domains are using C and C++ because of superior intrinsic efficiency, and the overheads of big-safe pointers would be commercially unsupportable; this favors the compile-time-safe pointer methods as described earlier.

Note that the printf/scanf functions use pointer arguments for the % s and % p formats. Therefore, although the old "unsafe" versions can be called via a "wrapper" in the CSAFE mode, the wrapper must indicate by a state flag that % p input produces a "not-indirectable" pointer in the CSAFE mode. The fully bounds-checked versions can be provided in BSAFE mode Including the big-safe-pointer alternative, the Safe Secure method has defined four modes of code generation: Debug BSAFE, Debug CSAFE, non-Debug BSAFE, and non-Debug CSAFE. A further alternative is to reduce the modes to two: Debug BSAFE and non-Debug CSAFE.

Implementing the SSBDF Using Name-mangling [mangl]

One non-limiting method for implementing the SSBDF 26 makes use of the name-mangling facilities of C++, employing appropriate encodings in the object-file representation to convey the bounds information for each fetch-and-store variable in each function's calling sequence. The parameter type can be encoded into the apparent classname of the pointer argument:

| | |
|---|---|
| __csafe__ptr__B1 | Bound = 1 |
| __csafe__ptr__Ba2 | Bound = int arg#2 |
| __csafe__ptr__L5 | Length = 5 |
| __csafe__ptr__La7 | Length = int arg#7 |
| __csafe__ptr__T9 | Tsize = 9 |
| __csafe__ptr__Ta__11 | Tsize = int arg #11 |
| __csafe__ptr__A3 | Tsize-adjusted = 3 |
| __csafe__ptr__Aa4 | Tsize-adjusted = int arg#4 |
| __csafe__ptr__ | Tsize-adjusted = external |
| Ae10Identifier | Identifier of 10 characters |
| __csafe__ptr__Oa1 | Lo = compatible-type ptr arg#1 |
| __csafe__ptr__Ha2 | Hi = compatible-type ptr arg#2 |
| __csafe__ptr__Ea3 | End = compatible-type ptr arg#3 |
| __csafe__ptr__Oa1Ha2 | Lo = compatible-type ptr arg#1, Hi = compatible-type ptr arg#2 |
| __csafe__ptr__I | Indirectable |
| __csafe__ptr__QI | Maybe-indirectable = indirectable or null |
| __csafe__ptr__NI | Not-Indirectable |
| __csafe__ptr__NT | Null-Terminated (with no other bounds info) |
| __csafe__ptr__NTTa1 | Null-Terminated, Tsize = int arg#1 |

Using this system, the object code for memcpy would embody encodings such as these:

```
__csafe__ptr__Ta1<void>
memcpy(__csafe__ptr__Ta1<void> s1,
       __csafe__ptr__Ta1<void> s2, size__t n);
```

Parameters which are not pointers may be involved in fetch-or-store expressions in the called function, so a similar encoding is provided for non-pointers:

| | |
|---|---|
| __csafe__n__Te2Id | This integer parameter is the Tsize of the external array named "Id". |
| __csafe__n__Ie1A | This integer parameter is indirectable (i.e. usable as subscript) for the external array named "A". |
| __csafe__n__Be3buf | This integer parameter is the bound of the external array named "buf". |
| __csafe__n__Le3str | This integer parameter is the length of the external array named "str". |

Sometimes within a Source Program 107 an integer parameter is used within the called function to specify the bounds, or subscript, for several different external arrays; the SSSA 35 knows which arrays those are from examination of the code in the called function. Rather than encoding all those array names into the parameter's augmented-type, the array with the smallest bound should be chosen; if two or more have this same bound, choose the shortest name; if two ore more names have the same length, choose the lexicographically smallest name. Here is an example that illustrates the intended usage:

```
File 1:
extern int a[ ];
void f(int k) {
    a[k] = 1;
}
File 2:
int a[64] = {0};
int main( ) {
    int j;
    for (j = 0; j < 64; ++j)
        f(j);
}
```

The augmented signature of the function f is as follows:

This presents a Requirement for the invocation of f in File 2, namely, that the argument must be suitable for use as a subscript on array a, and informs the main program that the variable j is being used for fetch-or-store access to a. The main program must determine the range of values for j and verify that j is suitable as a subscript on array a.

Since the names of these "helper" classes are intended only for consumption by the Safe Secure Compiler 23 itself, there is no need for human-readable names in this context. In the preferred implementation, an alternative encoding is produced by reducing the length of the names of the "_csafe" classes while avoiding collision with implementation-defined names in the implementer's namespace. The parsing of the class names as part of a mangled name requires no lookahead or added terminators. When integers are permitted in the name, a single-digit integer is encoded as-is, and an N-digit integer is prefixed by N−1 underscore characters. When an identifier is encoded, it is prefixed by the N-digit integer designating the length of the identifier (without any leading underscore characters).

Notating an attribute as a post-condition (shown as POST earlier) is achieved by adding a marker such as 'P' in the augmented name-mangling method:

```
int swprintf(___csafe_ptr_NTBa1PLa0<wchar_t> restrict s,
    size_t n,
    ___csafe_ptr_NT<const wchar_t> restrict format, ...);
```

Note that in the Guarantees, the returned value is indicated as "argument number zero", with digit zero.

In CSAFE mode, any pointer argument can have the "not-indirectable" attribute. This attribute is the default attribute for pointer parameters. This attribute is explicitly documented via the template type _csafe_ptr_NI<T>("csafe pointer, not-indirectable"), or more simply as an ordinary T* pointer.

All documents referred to above are incorporated herein by reference.

While the technology herein has been described in connection with exemplary illustrative non-limiting embodiments, the invention is not to be limited by the disclosure. For example, while specific examples above relate to specific programming languages, the techniques herein could be used for any of a variety of other programming languages and other machine-performed operations. Also, while examples above are presented in the context of software code generation (e.g., using compilers, cross-compilers, linkers, etc.), the techniques herein can be applied in various other machine implementation and other contexts including but not limited to software test and/or verification; generation and/or test and/or verification of hardware-based and/or software/hardware hybrid implementations; code interpreters; instruction disassemblers and other analyzers; and other contexts The invention is intended to be defined by the claims and to cover all corresponding and equivalent arrangements whether or not specifically disclosed herein.

I claim:

1. A software development method comprising:
   receiving a C or C++ input source file;
   automatically, by computer, compiling said input source file, said compiling including performing a lexical, syntactic, and semantic analysis and based at least in part on said analysis, code-generating a compiled object file comprising object code; and
   automatically, by computer, linking said compiled object file with system-dependent library code to produce an executable object file,
   wherein said semantic analysis includes
   employing a system of attributes of pointers, each attribute being a compile-time designation of a run-time state of an identifier, an expression, or a pointer including pointer-range states of the pointer, to infer preconditions that are applied at compile-time, at link-time, and at run-time and to infer postconditions that are applied at compile-time, at link-time, and at run-time, for at least one function within said source file, a precondition for an operation being one or more requirements imposed on preceding operations, declarations, and or initializations, and a postcondition for an operation, declaration, and initialization being one or more guarantees for subsequent operations produced by the operation, declaration, and/or initialization,
   maintaining a bounds data file in which requirements and guarantees are recorded for defined and undefined symbols,
   determining at compile-time for each operation involving pointers, arrays, and/or subscripts, whether said operation will perform in a well-defined manner without further run-time checking by determining, at compile time, whether the requirements of said operation are satisfied by the guarantees of said preceding operations, declarations, and/or initializations,
   wherein said code-generating produces run-time checking code sequences for operations which said determining does not determine will perform in a well-defined manner without further run-time checking, and
   wherein referencing said requirements and guarantees recorded in said bounds data file support said compiling, code-generating, and linking processes to automatically identify and/or eliminate within each process substantially all undefined behaviors of buffer overflow and null-pointer indirection of said input source file.

2. The method of claim 1 wherein said compiling provides fatal diagnostic messages.

3. The method of claim 1 further including processing an inputs check-list which records the checksum information for the inputs to the execution of said compiling.

4. The method of claim 1 wherein said compiling includes linking or combining said object file with said bounds data file, and producing fatal link-time diagnostics and/or an executable program.

5. The method of claim 1 wherein said compiling includes using a parse tree.

6. The method of claim 1 wherein said compiling includes generating fatal diagnostic messages in cases of undefined behavior.

7. The method of claim 1 wherein said compiling includes generating warning messages to call attention to risky situations.

8. The method of claim 1 further including using a pointer attribute hierarchy to control inference of attributes based upon other attributes.

9. The method of claim 1 further including using a pointer attribute predicate data structure to control determination of attributes resulting from predicate expressions.

10. The method of claim 1 further including generating a bounds data structure which tabulates the guarantees and requirements for expressions, sub-expressions, declarations, identifiers, and function prototypes.

11. The method of claim 1 further including generating an interlace inference data structure which controls the inference of requirements on an interface of each externally-callable function.

12. The method of claim 1 further including developing a bounds data symbol data structure which tabulates the requirements and guarantees for defined and undefined symbols during linking.

13. The method of claim 1 further including performing link-time analysis which matches the requirements to guarantees for function-call, external array, and external pointer linkage contexts.

14. The method of claim 1 further including performing link diagnosis to generate a fatal diagnostic at link-time if any requirement is unsatisfied, to thereby prevent the production of any executable program.

* * * * *